US011987447B2

(12) United States Patent
Serstad et al.

(10) Patent No.: US 11,987,447 B2
(45) Date of Patent: May 21, 2024

(54) ARTICLE DELIVERY SYSTEM AND METHOD THAT INCLUDES AN OVERHEAD RAIL NETWORK

(71) Applicant: Tompkins Robotics, Inc., Raleigh, NC (US)

(72) Inventors: James M. Serstad, Orlando, FL (US); Michael C. Futch, Orlando, FL (US)

(73) Assignee: Tompkins Robotics, Inc., Orlando, FL (US)

( * ) Notice: Subject to any disclaimer, the term of this patent is extended or adjusted under 35 U.S.C. 154(b) by 255 days.

(21) Appl. No.: 17/307,629

(22) Filed: May 4, 2021

(65) Prior Publication Data

US 2022/0356016 A1    Nov. 10, 2022

(51) Int. Cl.
*B65G 1/137* (2006.01)
*B61B 3/02* (2006.01)
*B65G 1/04* (2006.01)

(52) U.S. Cl.
CPC .............. *B65G 1/1373* (2013.01); *B61B 3/02* (2013.01); *B65G 1/0457* (2013.01); *B65G 1/1371* (2013.01)

(58) Field of Classification Search
CPC ............................. B65G 1/0457; B65G 1/1373
See application file for complete search history.

(56) References Cited

U.S. PATENT DOCUMENTS

| | | | |
|---|---|---|---|
| 5,246,332 A | 9/1993 | Bernard, II et al. | |
| 9,725,241 B2 * | 8/2017 | Swinkels | B65G 1/1378 |
| 2016/0355339 A1 * | 12/2016 | Peng | B65G 1/1378 |
| 2019/0367277 A1 * | 12/2019 | Sigrist | B65G 43/08 |
| 2020/0356945 A1 * | 11/2020 | Durkee | G06Q 10/087 |
| 2021/0061568 A1 * | 3/2021 | Ramanathan | B65G 1/1376 |
| 2022/0242665 A1 * | 8/2022 | Reischl | B65G 19/025 |
| 2022/0297941 A1 * | 9/2022 | Gabrieli | B65G 1/1373 |

FOREIGN PATENT DOCUMENTS

JP        08259175        10/1996

OTHER PUBLICATIONS

ISA/US; International Search Report for International Patent Application No. PCT/US2022/027574 dated Aug. 17, 2022, 5 pages.

* cited by examiner

*Primary Examiner* — Kaitlin S Joerger
(74) *Attorney, Agent, or Firm* — Parthiban A. Mathavan

(57) ABSTRACT

System includes an article supply location including a plurality of articles, and an overhead rail network with a plurality of rail sections. A self-guided and self-propelled hanging vehicle travels in both directions along the plurality of rail sections. The hanging vehicle has a first position in which a carrier containing at least one selected article is engaged with the hanging vehicle and a second position in which the carrier is detached from the hanging vehicle. The system further includes a controller. The controller determines a first delivery location among a plurality of delivery locations to deliver, with the hanging vehicle, the selected article based on a destination determined for the selected article. The controller further directs delivery of the carrier at the first delivery location by manipulation of the hanging vehicle from the first position to the second position.

23 Claims, 7 Drawing Sheets t-Rail with Rotating Hopper

ARTICLE DELIVERY SYSTEM AND METHOD THAT INCLUDES AN OVERHEAD RAIL NETWORK

TECHNICAL FIELD

The present invention relates to delivery technologies, and specifically to an article delivery system and method.

BACKGROUND ART

Ecommerce is becoming ubiquitous and increasingly competitive, with lead times for delivery continually getting shorter. To better compete with online e-retailers, brick and mortar store operators often use the physical store locations to fill online orders that are then either delivered to homes of customers or picked up at the store by customers. Since most brick and mortar stores are already positioned close to population centers, home deliveries can be accomplished with very short delivery lead times. For the same reason that most store locations are already positioned close to population centers, the stores can also serve as pickup locations for buy-online-pick-up-in-store orders. However, retail stores are generally not formatted or equipped for efficient online order fulfillment.

Accordingly, a need exists for a solution that would permit a conventional retail store to additionally operate as an online order fulfillment center in a reliable and cost-effective manner.

SUMMARY

This summary is provided to introduce in a simplified form concepts that are further described in the following detailed descriptions. This summary is not intended to identify key features or essential features of the claimed subject matter, nor is it to be construed as limiting the scope of the claimed subject matter.

According to one or more embodiments, a system for delivery articles to one or more destinations includes an article supply location including a plurality of articles, each article having an identifier that includes information related to a destination for delivering the article thereto. The system also includes an overhead rail network comprising a plurality of rail sections, at least one rail section positioned close to the article supply location. The system further includes a self-guided hanging vehicle configured for traveling in both directions along the plurality of rail sections, the hanging vehicle having a first position in which a carrier containing at least one selected article is engaged with the hanging vehicle and a second position in which the carrier is detached from the hanging vehicle. An information acquisition device is configured to interact with an identifier associated with the at least one selected tote or carrier. The system also includes a controller. The controller is configured to determine a first delivery location among a plurality of locations to deliver, with the hanging vehicle, the carrier based on the interaction with the identifier and a determined destination for the at least one selected article; and, direct the hanging vehicle to transport the carrier to the first delivery location and deliver the carrier by manipulation of the hanging vehicle from the first position to the second position to detach the carrier for delivery of the carrier at the first delivery location.

According to one or more embodiments, a control system forming part of a delivery and sorting system 100 is configured for use with delivery of a plurality of disparate articles includes a memory and a processor. The control system configured to receive orders for a plurality of disparate articles found within an article supply location. The control system is configured to direct a self-guided, self-automated or similar other hanging vehicle to transport a carrier containing the plurality of disparate articles to a delivery location, the hanging vehicle having a first position in which a carrier containing the plurality of disparate articles is engaged with the hanging vehicle and a second position in which the carrier is detached from the hanging vehicle, the self-guided hanging vehicle configured for traveling in both directions along a plurality of rail sections forming part of an overhead rail network. The control system is further configured to direct the self-guided vehicle to deliver the carrier at the delivery location by manipulation of the hanging vehicle from the first position to the second position. The control system is further configured to assign a first destination container of a plurality of destination containers to a first order to direct a first computer-controlled mobile transport device to deposit a first article and a second article associated with the first order into the first destination container based on a product type of each article, the first article and the second article selected from the plurality of disparate articles. In one embodiment, the control system is also configured to direct the first computer-controlled mobile transport device to transport the first article and the second article from the delivery location and deposit both the first article and the second article in the first destination container by manipulation of the first computer-controlled mobile transport device from a first position to a second position. In some embodiments, the first and second articles can be transferred to the first destination container by any robotic, mechanical, and manual sortation means and combinations thereof; accordingly, the control system may be configured to direct the transfer of the first and second articles to the first destination container using shoe sorters, conveyors, push arm diverters, Intralox sortation systems and similar other mechanisms. The control system is additionally configured to determine that the first order has been completed.

According to one or more embodiments, a system is provided. The system comprises: an article supply location including a plurality of articles, each article having an identifier that includes information related to a destination for delivering the article thereto; an overhead rail network comprising a plurality of rail sections, at least one rail section positioned close to the article supply location; a self-guided hanging vehicle configured for traveling in both directions along the plurality of rail sections, the hanging vehicle having a first position in which a carrier containing at least one selected article is engaged with the hanging vehicle and a second position in which the carrier is detached from the hanging vehicle; an information acquisition device configured to interact with the identifier associated with the at least one selected article; and a controller. The controller is configured to: determine a first delivery location among a plurality of delivery locations to deliver, with the hanging vehicle, the carrier based on the interaction with the identifier and a determined destination for the at least one selected article; direct the hanging vehicle to transport the carrier to the first delivery location and deliver the carrier by manipulation of the hanging vehicle from the first position to the second position to detach the carrier for delivery of the carrier at the first delivery location; determine one receiving container of a plurality of receiving containers to deposit the at least one selected article based on the interaction of the information acquisition device with the identifier; and direct delivery of the at least one selected article at the first delivery location to the receiving container.

According to one or more embodiments, a system is provided. The system includes an article supply location including a plurality of articles, and an overhead rail network comprising a plurality of rail sections, at least one rail section positioned adjacent to the article supply location. A self-guided and self-propelled hanging vehicle is configured for traveling in both directions along the plurality of rail sections. The hanging vehicle has a first position in which a carrier containing at least one selected article is engaged with the hanging vehicle and a second position in which at least one of: the carrier is detached from the hanging vehicle, and the selected article is discharged from the hanging vehicle. The system further includes a controller. The controller is configured to determine a first delivery location among a plurality of delivery locations to deliver, with the hanging vehicle, at least one of the carrier and the selected article based on a destination determined for the at least one of the carrier and the selected article, direct the hanging vehicle to transport the carrier to the first delivery location, and direct delivery of the at least one of the carrier and the selected article at the first delivery location by manipulation of the hanging vehicle from the first position to the second position.

According to one or more embodiments, the selected article comprises one or more of a case, a container, an item, a parcel, and a bag.

According to one or more embodiments, the carrier and the selected article are delivered at the first delivery location.

According to one or more embodiments, the article is delivered at the first delivery location, and wherein the carrier is not detached from the hanging vehicle.

According to one or more embodiments, the controller is configured to direct transferring of the at least one selected article by a manual process, According to one or more embodiments, the controller is configured to generate a notification for a human, the notification associated with an identification of the receiving container onto which the at least one of the carrier and the selected article is to be deposited.

According to one or more embodiments, the receiving container comprises one or more of a chute, a gaylord, a receptacle, a gravity conveyor, a bin, and a bag.

According to one or more embodiments, the first delivery location corresponds to an aisle segment of a retail store.

According to one or more embodiments, the article supply location is positioned near one of a loading dock of a retail store, an aisle segment of a retail store, and a storage location at a back room of a retail store.

According to one or more embodiments, the carrier comprises one or more of a container, a case, a bag, and a tote.

According to one or more embodiments, the controller is configured to deliver the at least one of the carrier and the selected article to a customer accessible region of a retail store for pick-up by a customer.

According to one or more embodiments, the overhead rail network is located at a backroom of a retail store.

According to one or more embodiments, the at least one selected article comprises a plurality of selected articles, wherein the article supply location is one of: a retail store, a fully or partially automated retail order fulfilment store, and a local fulfilment center.

According to one or more embodiments, the controller is configured to direct delivery of the at least one selected article using a mobile transport device, wherein the controller is further configured to direct the mobile transport device to transport the selected article to the receiving container and deposit the article by manipulation of the mobile transport device from a third position to a fourth position for receipt of the selected article in the receiving container.

According to one or more embodiments, the controller is configured to direct delivery of the at least one selected article by a mechanical sorter, wherein the controller is further configured to direct the mechanical sorter to deposit the selected article in the receiving container.

According to one or more embodiments, the controller is configured to direct delivery of the at least one selected article by a manual process, wherein the controller is further configured to generate a notification at or near the delivery location for a human for depositing the selected article in the receiving container.

According to one or more embodiments, the hanging vehicle is configured to one or more of: diverting, merging, and stopping at any location along the plurality of rail sections.

According to one or more embodiments, the hanging vehicle further comprises a picking mechanism attached thereto, wherein the picking mechanism is configured to engage and disengage the carrier.

According to one or more embodiments, the picking mechanism is configured for manual disengagement of the carrier by an operator on a floor level.

According to one or more embodiments, the operator is one or more of a human and a robot.

According to one or more embodiments, the at least one article comprises a plurality of articles associated with a multiple-order batch.

According to one or more embodiments, the first delivery location corresponds to an aisle segment in a retail store.

According to one or more embodiments, the article supply location is positioned near one or more of: a loading dock of a retail store, and a storage location at a back room of a retail store.

According to one or more embodiments, the carrier comprises one or more of a container and a tote.

According to one or more embodiments, the first delivery location comprises an elevator configured for transporting the carrier to an above floor level or a below floor level.

According to one or more embodiments, the controller is further configured to deliver the at least one selected article to a front region of a retail store for pick-up by a customer.

According to one or more embodiments, the overhead rail network is located at a backroom of a retail store.

According to one or more embodiments, the at least one selected article comprises a plurality of selected articles, wherein the article supply location is a retail store.

According to one or more embodiments, the receiving container comprises one or more of a chute, a gaylord, a receptacle, a gravity conveyor, a bin, and a bag.

BRIEF DESCRIPTION OF THE DRAWINGS

In order to describe the technical solutions of the examples of the present invention more clearly, the figures required to be used for the examples will be briefly introduced below. It should be understood that the following figures only show some examples of the present invention, and thus shall not be construed as limiting the scope thereof; and for a person skilled in the art, further relevant figures could also be obtained according to the figures without using inventive efforts.

DETAILED DESCRIPTION OF THE EMBODIMENTS

Figure 1:
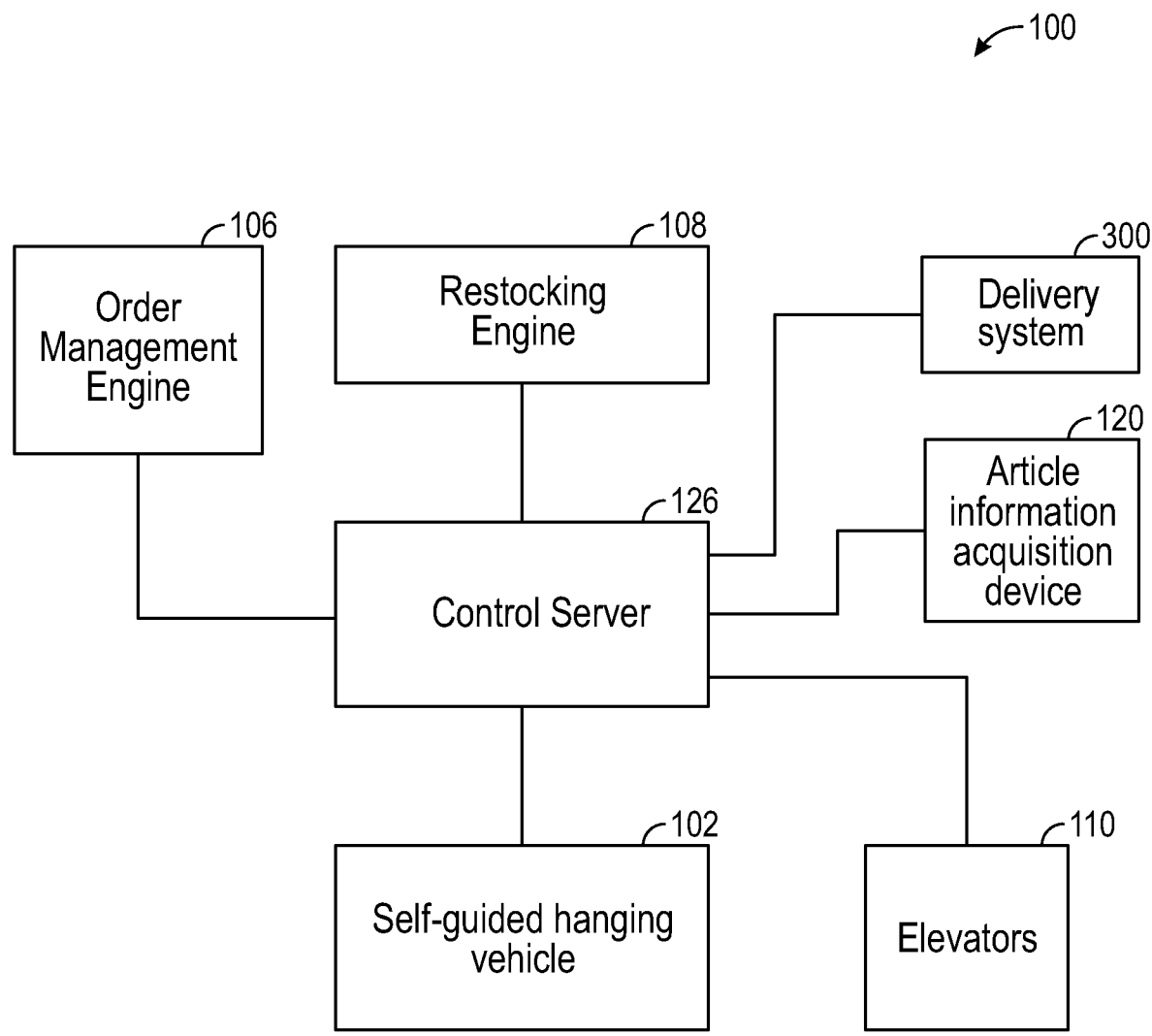
FIG. 1 illustrates an integrated delivery and sorting system 100 for use in a store backroom delivery environment, according to at least one embodiment of the presently disclosed subject matter.

Below, the technical solutions in the examples of the present invention are depicted clearly and comprehensively with reference to the figures according to the examples of the present invention. Obviously, the examples depicted here are merely some examples, but not all examples of the present invention. In general, the components in the examples of the present invention depicted and shown in the figures herein can be arranged and designed according to different configurations. Thus, detailed description of the examples of the present invention provided in the figures below are not intended to limit the scope of the present invention as claimed, but merely represent selected examples of the present invention. On the basis of the examples of the present invention, all of other examples that could be obtained by a person skilled in the art without using inventive efforts will fall within the scope of protection of the present invention.

As noted above, ecommerce is becoming ubiquitous and increasingly competitive, with lead times for delivery continually getting shorter. To better compete with online e-retailers, brick and mortar store operators may use their physical store locations to fill online orders that are then either delivered to homes of customers or picked up at the store by customers. Since most store locations are already positioned close to population centers, home deliveries can be accomplished possible with very short delivery lead times. For the same reason that most store locations are already positioned close to population centers, the stores can efficiently serve as pickup locations for buy-online-pick-up-in-store orders. However, retail store facilities are generally not formatted or equipped for online order fulfillment. Further, as retail stores are open to the public, any equipment used in order fulfillment needs to be out of the way of the store traffic public such that the equipment can operate without being hindered by the presence of store traffic public and in such a way as to not present a safety hazard to the store traffic public. Because this equipment will need to be located in stores (rather than in large distribution centers), the on-site maintenance and engineering capability requirements will need to be minimal. Retail stores must have products on shelves for in-person customers whereby the shelves need to be replenished.

Embodiments disclosed herein provide for a solution to modify a conventional retail store into an online order fulfillment center. Embodiments disclosed herein provide for an overhead rail which interfaces with various points located within the store selling and customer accessible areas and is connected to the back room or other areas of the store. This rail has no moving parts such as chains or diverts, is not powered, and is not a conduit for power. Embodiments disclosed herein provide for equipment that do not pose a safety risk to customers in the store. Embodiments of the presently disclosed subject matter accordingly provide for (1) transport of articles to re-stock the store shelves, (2) transport of articles to an order fulfillment or consolidation area or system, and (3) an automated or semi-automated system that is reliable and cost effective.

As mentioned herein, the term "article" may include any item of commerce. The term "article" can accordingly include an item of business, a thing of a particular and distinctive kind or class, a member of a class of things, an item of goods, and similar other items. In various embodiments, an article may comprise one or more of: a case, a container, an item, a parcel, and a bag. In various embodiments, the articles may comprise a plurality of articles associated with a multiple-order batch. In various embodiments, the article supply location may comprise one of: a retail store, a fully or partially automated retail order fulfillment store, and a local fulfilment center.

Figure 2:
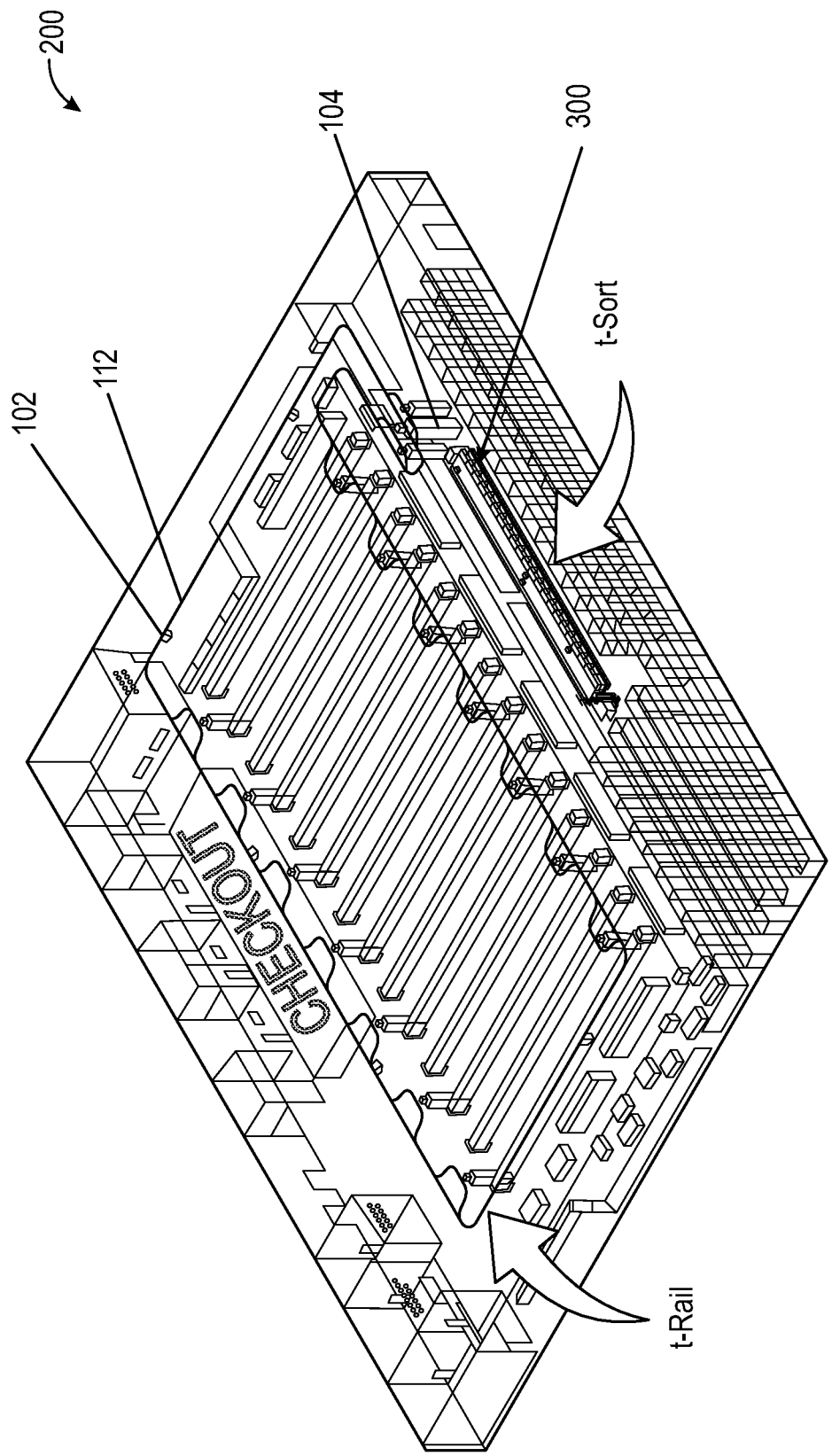
FIG. 2 illustrates a store backroom delivery environment 200, according to at least one embodiment of the presently disclosed subject matter.
Figure 3:
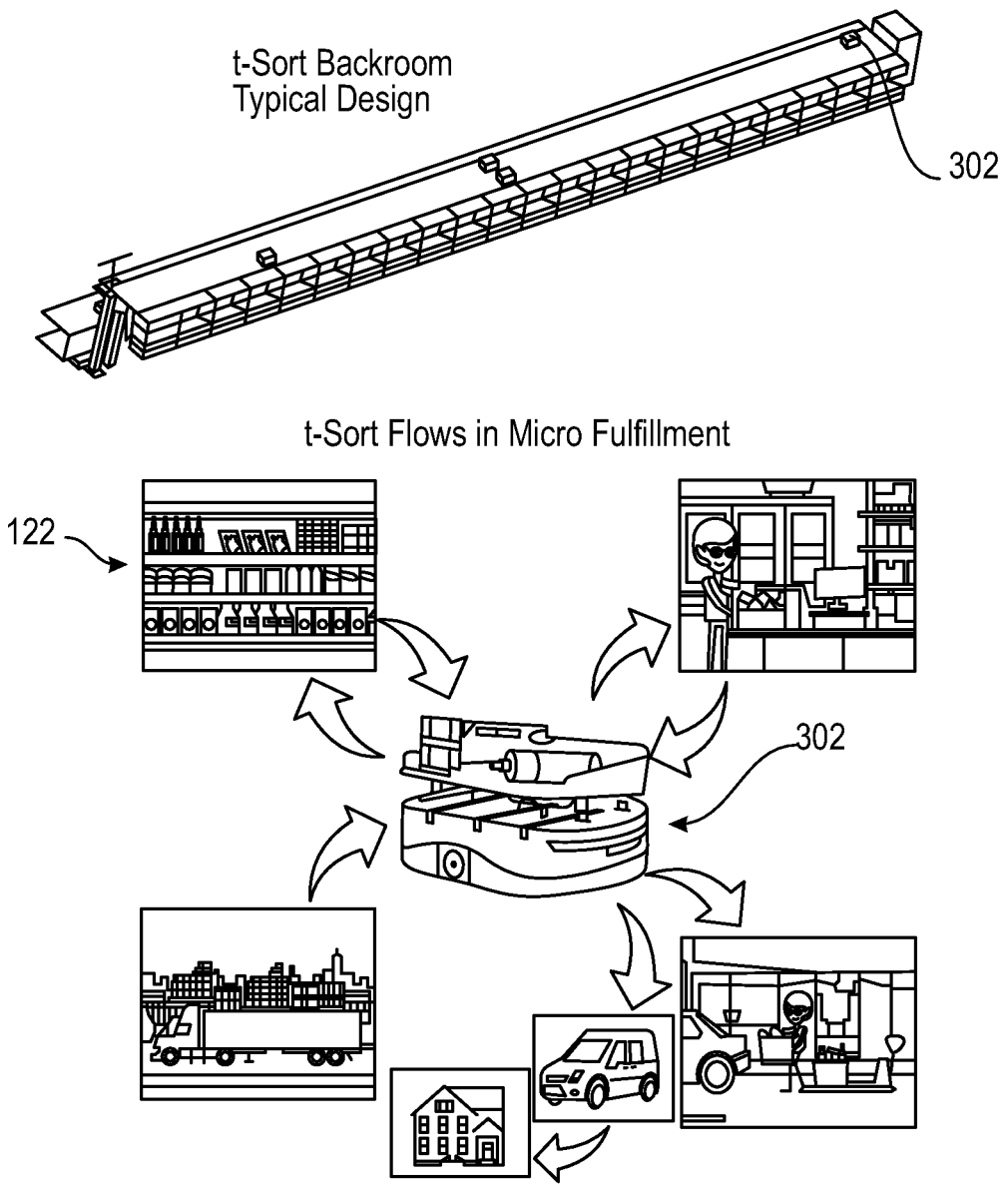
FIG. 3 illustrates delivery system 300 that forms part of delivery and sorting system 100 for use in a store backroom delivery environment, according to at least one embodiment of the presently disclosed subject matter.
Figure 4:
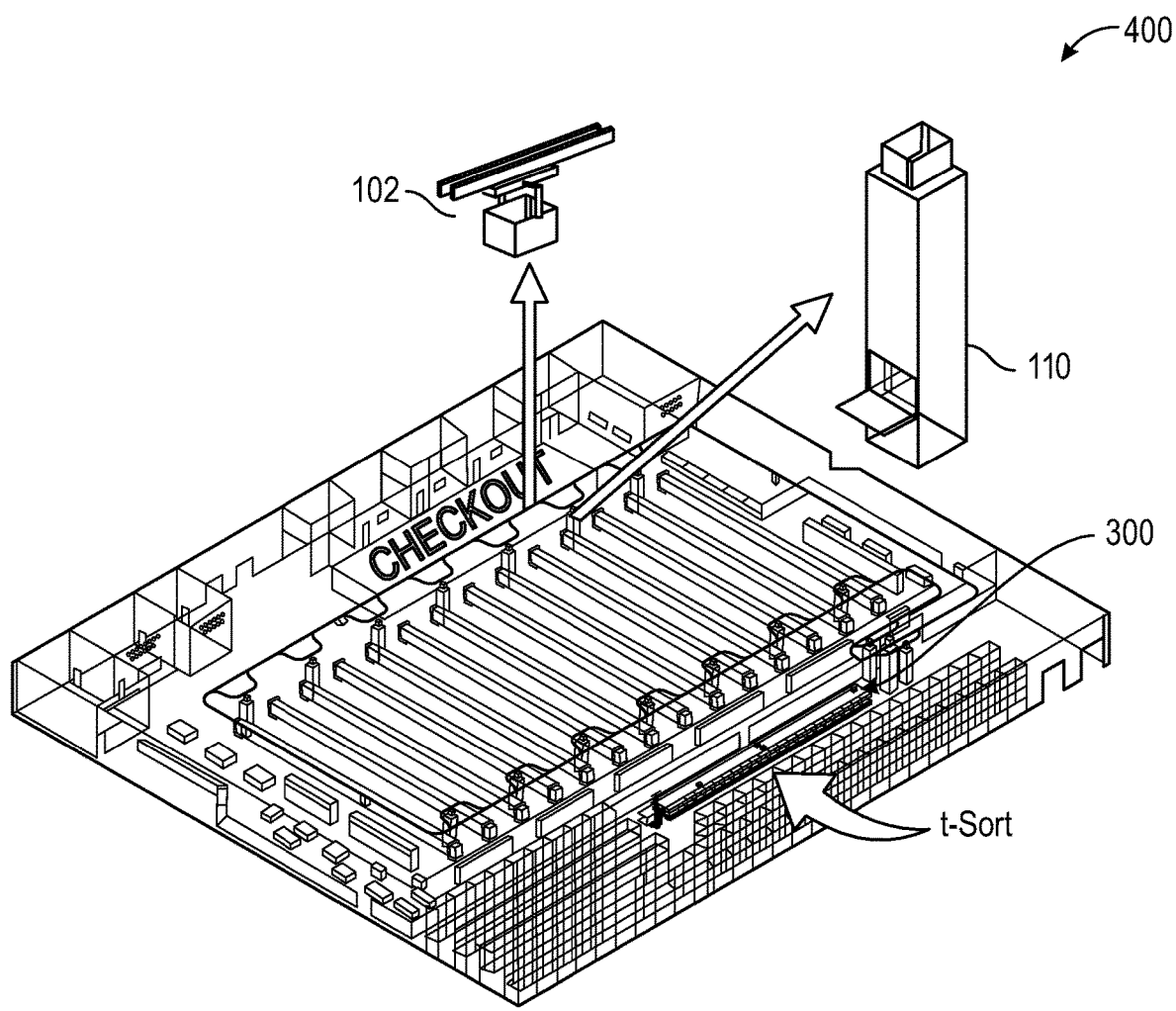
FIG. 4 illustrates a store backroom delivery environment 400 that includes at least one elevator 110, according to at least one embodiment of the presently disclosed subject matter.
Figure 5B:
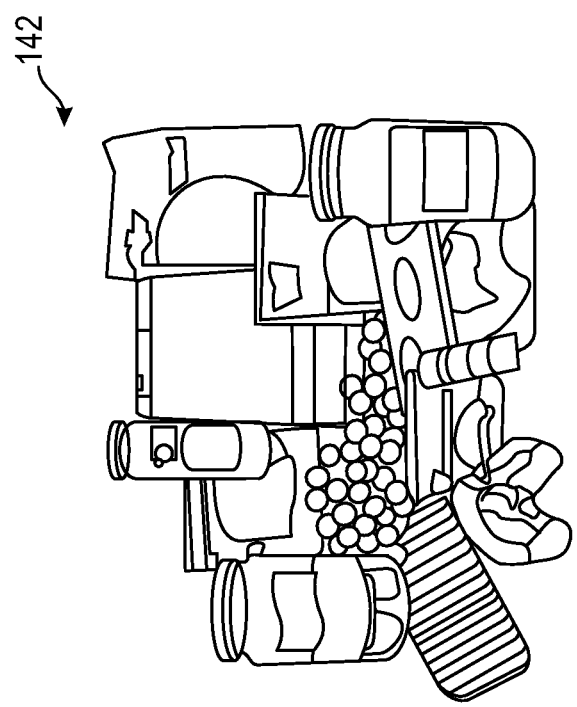
FIG. 5B illustrates various articles that can be delivered and sorted by the online order fulfillment system, according to at least one embodiment of the presently disclosed subject matter.
Figure 5A:
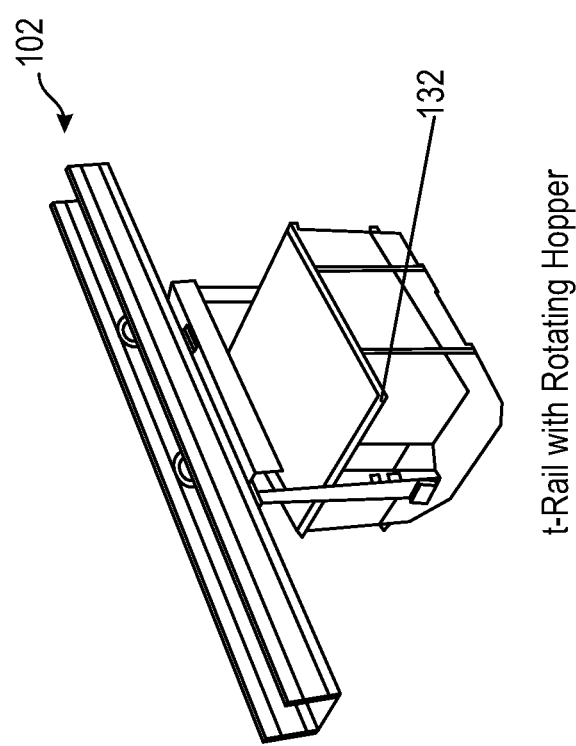
FIG. 5A illustrates a hanging vehicle including a hopper.
Figure 6:
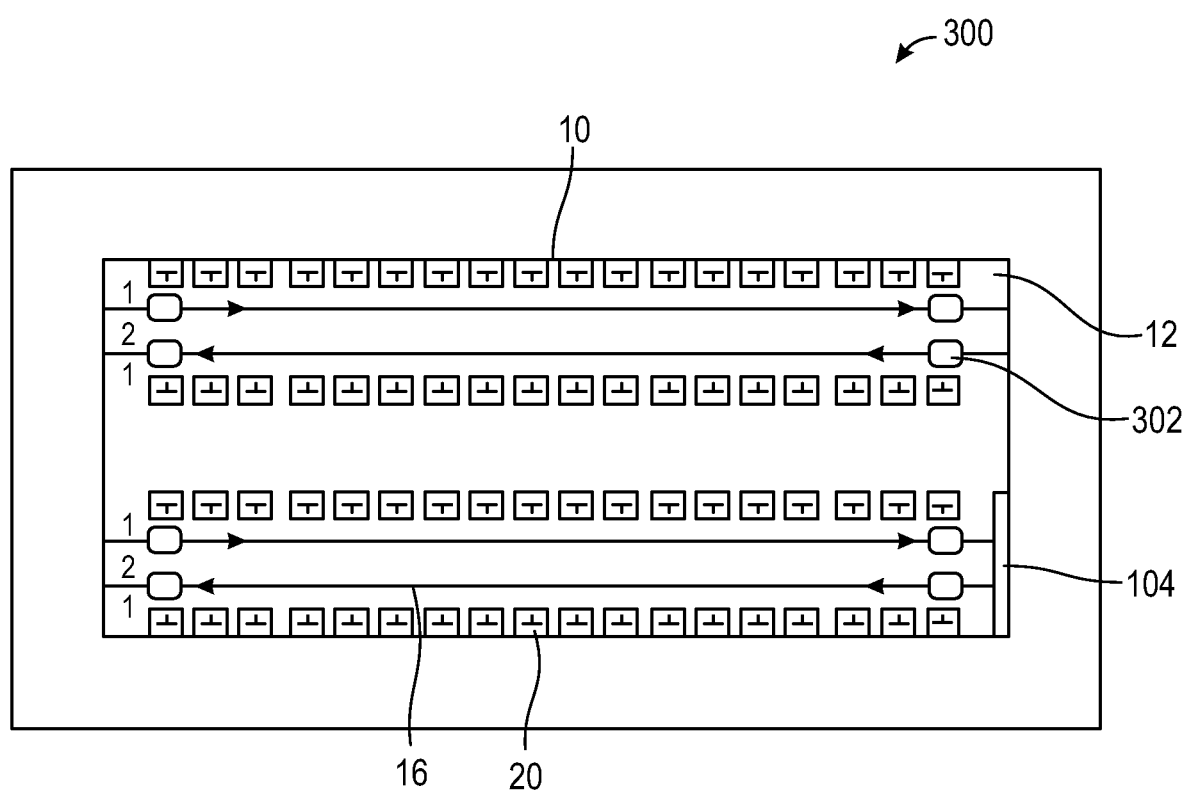
FIG. 6 illustrates some components of a delivery system 300, according to at least one embodiment of the presently disclosed subject matter.
Figure 7:
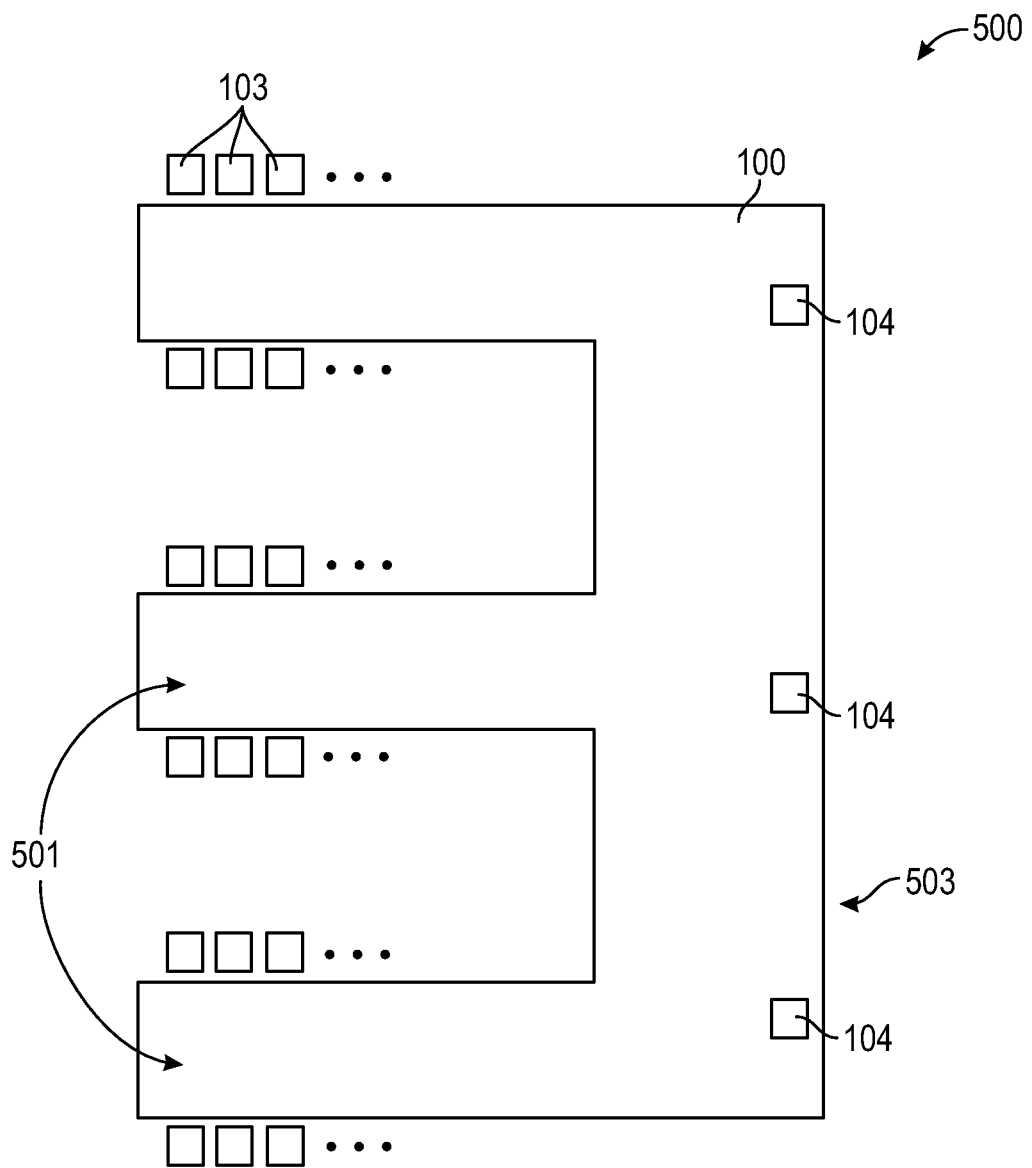
FIG. 7 illustrates some components of a delivery system 500, according to at least one embodiment of the presently disclosed subject matter.

FIG. 1 illustrates an integrated delivery and sorting system 100 (alternately referred to herein as "system 100" or generally as "system") for use in a store backroom delivery environment, according to one or more embodiments disclosed herein. FIG. 2 illustrates a store backroom delivery environment 200, according to at least one embodiment of the presently disclosed subject matter. FIG. 3 illustrates delivery system 300 that forms part of system 100 for use in a store backroom delivery environment, according to at least one embodiment of the presently disclosed subject matter. FIG. 4 illustrates a store backroom delivery environment 400 that includes at least one elevator 110, according to at least one embodiment of the presently disclosed subject matter. FIG. 5A illustrates a hanging vehicle including a hopper, and FIG. 5B illustrates various articles that can be delivered and sorted by the online order fulfillment system, according to at least one embodiment of the presently disclosed subject matter. FIG. 6 illustrates some components of a delivery system 300, according to at least one embodiment of the presently disclosed subject matter. FIG. 7 illustrates some components of a delivery system 500, according to at least one embodiment of the presently disclosed subject matter.

As illustrated in FIG. 1, system 100 includes various components, some of which are depicted in a representative manner as blocks representing a generic descriptor of the technology. System 100 may include more or less components than those illustrated. In one embodiment, system 100 includes a control server 126 and an order management engine 106 configured for communicating with one or more components of system 100 as described herein, and as shown, for example, in FIG. 1. In one embodiment, control server 126 includes memory, a processor, and/or one or more communication interfaces. A network may form part of system 100 wherein the network may take on any appropriate form, including a wireless network such as WIFI, cellular, or other frequency bands for private use, or a hardwired network such as LAN, WAN, internet, etc., and combinations thereof. In one embodiment, control server 126 communicates over the network with the cloud. In some embodiments, one or more components of control server 126 may reside in the cloud. Similarly, several of the components such as, for example, restocking engine 108, elevator controller operating elevators 110, self-guided hanging vehicles 102, delivery system 300, information acquisition device 120, and control server 126, among others, may communicate over network with the cloud. In some embodiments one or more components of system 100 may reside in the cloud. For example, in one embodiment, one or more of components described herein including order management engine 106, restocking engine 108, elevator controller operating elevators 110, and control server 126, among others, may reside in the cloud. In a further example, only order management engine 106, and restocking engine 108 may reside in the cloud.

Control server 126 and one or more other components of system 100 may be in communication with the cloud. As used herein, the term "cloud" refers to several servers connected to the internet that can be leased as part of a software or application service. Cloud-based services can include web hosting, data hosting and sharing, and software or application use. The term "cloud" also refers to cloud computing, where several servers are linked together to share the load. This means that instead of using one single powerful machine, complex processes can be distributed across multiple smaller computers. In various embodiments, control server 126 can be or can otherwise include a server as the term "server" is understood in its broadest sense. The term "server" as used herein includes any computer that provides data to other computers. It may serve data to systems on a local area network (LAN) or a wide area network (WAN) over the Internet. In various embodiments, control server 126 can be or can include a cloud server. The term "cloud server" as used herein includes any pooled, centralized server resource that is hosted and delivered over a network—typically the Internet—and accessed on demand by multiple users. A cloud server can be remotely located (e.g., reside in a remote cloud server configuration). A cloud server can be a virtual server (rather than a physical server) running in a cloud computing environment. A cloud server can be built, hosted, and delivered via a cloud computing platform via the internet, and can be accessed remotely. A cloud server can include all the software it requires to run and can function as an independent unit. A cloud server can perform all the same functions of a traditional physical server including delivering processing power, storage, and applications. One of the advantages of cloud storage is that there are many distributed resources acting as one—often called federated storage clouds. This makes the cloud very tolerant of faults, due to the distribution of data. Use of the cloud can reduce the creation of different versions of files, due to shared access to documents, files, and data.

Further, each of the components shown in FIG. 1 may be in communication with one or more other components through a wired and/or a wireless network. For example, the cloud and control server 126 may further communicate with restocking engine 108, one or more self-guided hanging vehicles 102 that are computer-controlled, and with an elevator controller operating elevator 110. In one embodiment, system 100 can further include an information acquisition device 120 that is configured for imaging or otherwise interrogating an image or other identifier of an article to determine a destination thereof. System 100—in conjunction with order management engine 106, and restocking engine 108, among others—may deliver and sort articles in a multiple-order batch, for example, and use a plurality of hanging vehicles 102 and subsequently a plurality of mobile transport devices 302 to deposit the articles into appropriate bins, chutes or containers marked for specific customers. In one embodiment, information acquisition device 120 can be in communication with one or more of control server 126 and order management engine 106.

According to various embodiments, system 100 further comprises an article supply location that includes a plurality of articles 142, each article 142 optionally having an identifier that includes information related to a destination for delivering the article thereto. System 100 further includes an overhead rail network 112 comprising a plurality of rail sections. At least one rail section is positioned close to an article supply location. System 100 further includes one or more robotic self-guided hanging vehicles 102 configured for traveling in both directions along the plurality of rail sections. Each hanging vehicle 102 has a first position in which a carrier containing at least one selected article is engaged with hanging vehicle 102 and a second position in which the carrier is detached from the hanging vehicle 102. In some embodiments, the carrier may be carried within, or otherwise supported by carrier 132 (see FIG. 5) of hanging vehicle 102. Thus, in some embodiments, each hanging vehicle may itself include a built-in provision for carrying articles by way of a carrier 132. Information acquisition device 120 is configured to interact with an identifier associated with the at least one selected article.

In various embodiments, hanging vehicle 102 may include a delivery robot, a transportation robot, a loading/unloading robot, or other types of traveling robots that can operate while hanging from overhead rail network 112. Hanging vehicles 102, in addition to being in wireless connection with control server 126, may also be in wireless connection with a second server. Based on instructions/signals received from the control server 126, the hanging vehicle 102 is capable of traveling forward or backward as well as turning along overhead rail network 112 to a target delivery/induction/customer interface area to perform tasks such as unloading (or loading) of carriers or articles carried by a hanging vehicle 102.

In one embodiment, controller server 126 includes a controller. Control server 126 is configured to determine a first delivery location 104 among a plurality of delivery locations 104 to deliver, with the hanging vehicle, the carrier based on the interaction with the identifier and a determined destination for the at least one selected article. Control server 126 is further configured to direct the hanging vehicle to transport the carrier to the first delivery location (for e.g., the first delivery location may be an induction location) and deliver the carrier by manipulation of the robotic hanging vehicle from the first position to the second position to detach the carrier for delivery of the carrier at the first delivery location.

Control server 126 operates to guide the navigation of hanging vehicles 102 as hanging vehicles 102 traverse along overhead rail network 112 from the article supply location to a first delivery location (such as an induction location) associated with a delivery system such as delivery system 300 that is communication with control server 126. Control server 126 is further configured to prevent collision between several hanging vehicles 102 as hanging vehicles 102 traverse along overhead rail network 112 from the article supply location to a first delivery location associated with delivery system 300, and back to the article supply location to receive or load therein a carrier containing new set of articles for delivery to the first delivery location associated with the delivery system.

In various embodiments, hanging vehicle 102 is configured to one or more of diverting, merging, and stopping at any location along the plurality of rail sections. In some embodiments, hanging vehicle 102 further comprises a picking mechanism attached thereto, wherein the picking mechanism is configured to engage and disengage the carrier. In at least one embodiment, the picking mechanism is configured for manual disengagement of the carrier by an operator on a floor level. Accordingly, in some embodiments, carrier 132 may be omitted from hanging vehicle 102, with carrier 132 being replaced by a picking mechanism that is configured to engage and disengage a carrier such as, for example, a tote.

Self-guided hanging vehicles 102 (see FIG. 5) are configured for travelling on overhead rail network 112 (see FIG. 2). Self-guided hanging vehicles 102 can be self-powered and self-guided. Hanging vehicles 102 can be auto-navigating small vehicles. Self-guided hanging vehicles 102 can divert, merge, and stop itself anywhere in the overhead track with no action required on the part of the track. A mechanism or device at or onto which self-guided hanging vehicle 102 can drop off a container of articles (or a single article) to deliver the articles from an overhead position to a height at which an operator can retrieve the container of articles. System 100 can include one or more interfaces configured for the operator at the floor level to offload or receive the container of articles (or a single article). In at least one embodiment, a coupling device attached to the bottom of the hanging vehicle 102 may operate in an automated fashion to engage and disengage the carrier carried by hanging vehicle 102. Accordingly, hanging vehicles 102 are configured to pick up and drop off containers of articles using any suitable known mechanism or device that is designed for transferring the containers to and from the elevated overhead rail network 112 and the operator accessed floor level. Control server 126 operates to manage the operation of hanging vehicles 102 along overhead rail network 112, including movement of hanging vehicles 102, avoiding collision among hanging vehicles 102, charging of hanging vehicles 102, and all other associated tasks.

In various embodiments, overhead rail network 112 includes no moving parts; in other words, overhead rail network 112 remains stationary with hanging vehicle 102 is mobile and self-propelled by way of an in-built locomotion source such a battery powered locomotion system. Hanging vehicle 102 moves along stationary overhead rail network 112 as guided by system 100 in general and control server 126 in particular. Overhead rail network 112 may be positioned within a retail store such that it can operate in a safe manner without causing a safety hazard to the retail store customers or employees. In one embodiment, the whole or a major portion of overhead rail network 112 may be located at a backroom of a retail store. In one embodiment, the whole or a major portion of overhead rail network 112 may be positioned above the aisle region of a retail store.

In various embodiments, overhead rail network 112 can represent a multi-purpose robotic transport system by being configured for use in retail/grocery store transport to deliver articles to and from the selling floor for multiple process flows. Overhead rail network 112 can also be used in a warehouse environment for tote or bulk transport of goods. In both cases, overhead rail network 112 is positioned overhead to stay clear of floor level traffic and to avoid congestion. In its store-based mode, hanging vehicles 102 traversing overhead rail network 112 represent overhead transport robots capable of carrying totes containing cases, loose items, or orders for one or more customers or for the stocking of shelves in a retail store aisle. Hanging vehicles 102 traversing overhead rail network 112 permit the delivery of articles for shelf replenishment to specific aisle segments. Hanging vehicles 102 traversing overhead rail network 112 can deliver totes of picked articles for BOPIS and ecommerce from individual aisle segments to backroom for order fulfillment. System 100 further controls and operates elevators 110 nestled in aisle shelving structure to move articles between the floor level and the overhead rail network 112.

According to at least one embodiment, hanging vehicles 102 traversing overhead rail network 112 are mated with delivery system 300 or delivery system 500 for order delivery, sortation and fulfillment. In one embodiment, hanging vehicles 102 traversing overhead rail network 112 permit the delivery of completed and packages orders to a customer interface location optionally located at a front area of a retail store.

Embodiments as disclosed herein may be advantageously installed in supercenters, grocery stores, mall anchors, club warehouses, or any large format retail store setting. In its warehouse mode, hanging vehicles 102 traversing overhead rail network 112 permit the carrying one or more packages or cartons of varying sizes through warehouses and distribution centers with speed and accuracy. Overhead design can provide for continuous movement without any disruption to floor-level activities. Hanging vehicles 102 traversing overhead rail network 112 can operate in any type of DC, FC, shipping, and processing environments. Embodiments as disclosed herein may further include or use elevators or decline/incline sections to interact with the floor level operations.

Mobile transport device 302 may include a delivery robot, a transportation robot, a loading/unloading robot, or other types of traveling robots. Mobile transport device 302 can accordingly be an auto-navigating small vehicle. Mobile transport device 302, in addition to being in wireless connection with control server 126, may also be in wireless connection with a second server. Based on instructions/ signals received from the control server 126, the mobile transport device 302 is capable of traveling forward or backward as well as turning along track 16 to a target area associated with a receiving container 20 as marked by a marker to perform tasks such as unloading (or loading) articles.

Information acquisition device 120 may be configured to acquire article information of the articles to be delivered and sorted, and the article information may contain destinations of the articles to be delivered and sorted. A plurality of information acquisition devices 120 may be provided, such that the information acquisition and delivery of the plurality of articles to be delivered and sorted may be performed simultaneously, so as to significantly increase the article information acquisition efficiency, thereby improving the article delivery efficiency. Information acquisition devices 120 may acquire the article information of the articles to be delivered and sorted in various ways. At the induction station, information acquisition device 120 interacts with an identifier present on an article 142 or with the article itself. The identifier may be a barcode; alternately, the identifier may be a similar other unique identification code, such as a UPC code, QR code or RFID tag. Information acquisition device 120 is positioned proximal the platform assembly 10. In one embodiment, information acquisition device 120 is a UPC scanner; in an alternate embodiment, information acquisition device 120 may be carried by, and operated by, a person, i.e., information acquisition device 120 may not be fixedly positioned. In a further embodiment, each mobile transport device 302 may include a scannable code such that when an article 142 is placed on mobile transport device 302, information acquisition device 120 scans both the UPC on the article 142 and the scannable code on the mobile transport device 302 to determine which article is associated with which vehicle. Alternatively, the mobile transport device 302 may include an information acquisition device 120 mounted thereon for imaging the code or identifier present on the article 142. All of these identification devices may be RFID tags, other types of bar codes, or any other type of item and vehicle recognition methods. In some embodiments, the information code may be a bar code, a two-dimensional code, a radio frequency tag etc., and correspondingly, the information acquisition device 120 may be a bar code scanner, a two-dimensional code scanner, a radio frequency identifier, etc. According to actual demands, in addition to the destination, the article information may further include information about the article volume, weight, appearance etc., and correspondingly, the information acquisition device 120 may further include a weighing device, a volume scanner, a camera, etc.

According to one embodiment, as orders are received, control server 126 groups the orders into a multiple-order batch, and the articles within the multiple-order batch are subsequently divided into groups by store aisle. A picker in a store aisle picks all the articles in the multiple-order batch from the store aisle into a tote or group of totes. These totes are then placed into a first elevator 110 (FIG. 4 illustrates elevator 110) located in the picker's aisle, lifted to the level required for pickup by hanging vehicle 102. A hanging vehicle 102 carries the tote to the back room of the retail store. The tote is deposited at a second elevator 110 by the hanging vehicle 102. The second elevator 110 may transport the deposited tote down to the level at which an operator removes the tote. The tote is then positioned by a mechanical sorter, a put-wall, a robotic sortation system, etc. that forms part of delivery system 300, and articles present in the tote are delivered and sorted to their respective orders. When the orders have been completed, the articles associated with each respective order are removed from the delivery system 300 and packed appropriately based on the order type.

In some embodiments, as part of an online orders fulfillment process, hanging vehicle 102, as controlled by control server 126, may pick up a tote containing two or more articles 142 at an article supply location associated with a retail store. In some embodiments, the article supply location may be positioned near a loading dock of a retail store, a storage location at a back room of a retail store, and any other similar location. Hanging vehicle 102, as controlled by control server 126, may travel along overhead rail network 112 carrying the tote and arrive at or near an induction station, and deliver the tote containing the two or more articles 142 at or near a first delivery location, which may be an induction station. An operator may load one or more articles 142 onto a mobile transport device 302. Mobile transport device 302 may traverse panel 12 of platform assembly 10 carrying the one or more articles may be directed by the control server 126 to deposit articles 142 into the specific receiving container 20 associated with the specific marker based on the location of the specific marker. Thus, in operation, once the control server 126 determines that a receiving container 20 needs articles 142 being carried by mobile transport device 302 to be deposited therein, the control server 126 causes mobile transport device 302 to traverse panel 12 of platform assembly 10 to the receiving container 20 and to deposit the articles 142 by manipulation of the mobile transport device 302 from a first position where the articles 142 is firmly located on the mobile transport device 302 to a second position where the articles commence sliding towards the receiving container 20 for depositing the selected articles 142 in the receiving container 20.

Accordingly, in various embodiments, control server 126 may coordinate delivery of a plurality of selected articles at a delivery location 104 (e.g., an induction location), wherein control server 126 is further configured for coordinate the delivery of the plurality of selected articles by one or more of: a human, a mechanical process, and a robotic process. Hanging vehicle 102 and mobile transport device 302 may carry a plurality of articles 142 associated with one or more multiple-order batches, as determined by control server 126 and as directed by control server 126. In some embodiments, hanging vehicle 102 and/or mobile transport device 302 may carry a single article 142 associated with a single order as directed by control server 126, in a single trip.

In one embodiment, the delivery location (or induction location) where hanging vehicle 102 delivers the articles or the carrier containing the articles corresponds to an aisle segment in a retail store. In various embodiments, the carrier can represent a container or a tote. In one embodiment, the delivery location (or induction location) where hanging vehicle 102 delivers the articles or the carrier containing the articles represents an elevator configured for transporting the carrier to an above floor level or a below floor level. In one embodiment, the delivery location (or induction location) where hanging vehicle 102 delivers the articles or the carrier containing the articles corresponds to a front region of a retail store for subsequent pick-up by a customer.

Control server 126 may operate to complete an analytical processing of the obtained article information of all the articles to be delivered and sorted, thereby obtaining the destination information of the respective articles to be delivered and sorted. Control server 126 is in connection with all the information acquisition devices 120 so as to obtain the article information acquired by all the information acquisition devices 120, to obtain the destinations of the respective articles to be delivered and sorted. In one embodiment, system 100 and control server 126 are supplied with a relational database listing various sets of features to be considered by a real time optimization algorithm operating on order management engine 106, and restocking engine 108 for purposes of optimizing delivery of the articles. The relational database may include, among others, information such as delivery address, delivery stop, delivery route, and delivery preferences, associated with each article.

According to at least one embodiment, when one SKU (stock keeping unit) needs to be re-stocked on store shelves, restocking engine 108 operates to determine which aisle the article belongs to. The articles to be restocked are placed into a tote in the back room of the retail store and delivered by one or more elevators 110 and subsequently by hanging vehicles 102 traversing overhead rail network 112. According to at least one embodiment, completed orders (for e.g., control server 126 in conjunction with delivery system 300 may operate to complete the order) are sent back up an elevator 110 (control server 126 communicates with an elevator controller operating elevator 110), and optionally subsequently by hanging vehicles 102 traversing overhead rail network 112, to be delivered to the front of the retail store for customer pick-up.

In some embodiments, order management engine 106 and/or restocking engine 108 may be optional. Accordingly, in at least one embodiment, order management engine 106 and/or restocking engine 108 do not form part of system 100; instead, order management engine 106 and/or restocking engine 108 may form part of an end user's host system.

According to various embodiments, the entirety of system 100 may fit within an existing backroom space of a retail store, thereby eliminating extra construction or expansion costs. In at least one embodiment, delivery system 300 of system 100 can fit in a row of existing pallet rack. In various embodiments, system 100 is portable and quickly assembled at a site with no electrical, fire or building permits required prior to installation. System 100 can further process articles that comprise room temperature, refrigerated, frozen, fresh, and all other product types. System 100 can further process articles such as eggs, produce, cases of water almost all products sold at a grocery store or supercenter. In various embodiments, the unique design of system 100 allows for large bulky product on lower level of t-sort and smaller goods on upper level. System 100 as disclosed herein represents a flexible, modular, and portable solution with hanging vehicles 102 and mobile transport devices 302 installed in minutes, delivered and sorted to delivery destinations established within hours, and all components of system 100 being able to be moved to another site overnight. The delivery system 300 according to the embodiments disclosed herein can provide for a more cost-effective, scalable, single store solution than an ASRS (automated storage and retrieval system).

According to at least one embodiment, delivery system 300 works in conjunction with hanging vehicles 102 (as directed by control server 126) to provide overhead transport of articles to and from the selling floor eliminating floor congestion, reducing labor further, eliminating human interaction and adding incremental return on investment (ROI). In one embodiment, the picked articles for orders are delivered and sorted via human, or mechanical and/or robotic process. In one embodiment, completed orders are delivered to customer receiving location or staging locations for pickup.

Accordingly, in some embodiments, system 100 further comprises a delivery system 300. In various embodiments, hanging vehicle 102 drops off a tote containing goods or articles at an induction point of delivery system 300 such as first delivery location 104, and delivery system 300 may handle further delivery and sortation steps associated with the dropped-off articles from that point forward as controlled by control server 126. Delivery system 300 can include a platform assembly 10 for use of delivery articles. Platform assembly 10 may include wheels for mobility in some embodiments. The platform assembly 10 may also include a track 16 formed on its surface so that the mobile transport devices 302 may traverse along the track 16. Track 16 may be formed around, across or in any other configuration on the surface of panel 12 to facilitate movement of the mobile transport devices 302. Platform assembly 10 further includes a plurality of markers formed on it with a receiving container 20 positioned about at least one of the plurality of markers. Control server 126 communicates with mobile transport devices 302 and with a plurality of other components described herein including an induction station such as delivery location 104 positioned on platform assembly 10, the delivery location 104 including an imaging device such as information acquisition device 120. Through the provision of the markers, when a mobile transport device 302 traverses over a specific marker, control server 126 communicates over a network with the mobile transport device 302 to determine that a specific mobile transport device 302 is at location "A" associated with a specific receiving container 20, for example (control server 126 is already aware of the specific location of each of the markers formed on the platform assembly 10). The location of the specific mobile transport device 302 is then compared with a known association of an order of any type that is being processed (or any type of shipping package processed in the system) with the specific receiving container 20. Mobile transport device 302 carrying thereon an article 142 associated with the retail order may then be directed by the control server 126 to deposit the article 142 into the specific receiving container 20 associated with the specific marker based on the location of the specific marker.

Thus, in operation, once control server 126 determines that a receiving container 20 needs an article 142 deposited therein, the control server 126 causes mobile transport device 302 to traverse panel 12 to the receiving container 20 and to deposit the article 142 by manipulation of the mobile transport device 302 from a first position where the article 142 is firmly located on the mobile transport device 302 to a second position where the article commences sliding towards the receiving container 20 for depositing the selected article 142 in the receiving container 20. In one embodiment, instead of a mobile transport device transporting the first and second articles, the first and second articles can be transferred to the first destination container by any well-known robotic, mechanical, and manual sortation and transfer means and combinations thereof. For example, in one embodiment, control server 126 is configured to direct delivery of the at least one selected article using a mobile transport device, wherein the controller is further configured to direct the mobile transport device to transport the selected article to the receiving container and deposit the article by manipulation of the mobile transport device from the third position to the fourth position for receipt of the selected article in the receiving container. In a further embodiment, control server 126 is configured to direct delivery of the at least one selected article by a mechanical sorter, wherein the controller is further configured to direct the mechanical sorter to deposit the selected article at the receiving container. In a furthermore embodiment, control server 126 is configured to direct delivery of the at least one selected article by a manual process, wherein the controller is further configured to generate a notification for a human for depositing the selected article in the receiving container. The control system may be configured to direct the transfer of the first and second articles to the first destination container using means such as shoe sorters, conveyors, push arm diverters, Intralox sortation systems and similar other mechanisms (commonly referred to as "mechanical sorter"). For example, the first and second articles may be pushed off in a crossbelt set-up.

The mechanical sorter as controlled by control server 126 can be any suitable mechanical sortation system ranging from basic pushers and diverters that sort fewer than 30 cartons per minute to sophisticated high-speed sorters that handle as many as 450 items per minute. The term "mechanical sorter" as used herein refers to any system that automatically sorts products as they move through a facility. Based on the speed of sortation, mechanical sorters can be broadly divided into slow-speed, medium-speed, and high-speed systems.

Slow-speed sortation mechanical sorters, the slowest and least expensive sorters, work in conjunction with standard belt or roller conveyor lines. These sorters typically handle fewer than 30 cartons or totes per minute. One example of a slow-speed sorter is a deflector arm in which an arm or paddle sits alongside a conveyor line, opposite a divert point. As a carton approaches, the arm swings out across the conveyor, catching the carton and channeling it off at an angle. A large amount of space is needed between cartons to avoid traffic jams behind a deflector arm sorter. The deflectors can be used in a slug mode with the arm staying in place to divert a string of cartons down the same divert point. Another example of a slow-speed sorter is a pusher, which is mounted at the side of a conveyor line, directly across from a divert point. When a product reaches the divert point, the pusher springs out across the conveyor, pushing the product off at a right angle. Pushers can operate faster than deflector arms because they do not require as much space between cartons.

Medium-speed mechanical sorters handle about 30 to 200 items per minute. The most popular among them are pop-up sorters. These linear sorters usually move products down the line on belt conveyor. When a product reaches the product's divert location, wheels or rollers pop up under the product, lift it slightly above the conveyor surface, and power it off the conveyor, usually at a 30-degree to 45-degree angle. A common style of pop-up wheel sorter uses a wide conveyor belt that ends at a divert point and begins again right after the divert point, creating a gap in the conveyor. The gap is filled with several rollers that extend the width of the conveyor. When a carton reaches the gap in the conveyor, one of the following happens: (1) the angled wheels remain in place and the carton continues moving forward—across the rollers and onto the next section or conveyor, or (2) the angled wheels rise up under the product, lifting it slightly off the conveyor. The wheels then rotate, diverting the carton off the line. An alternate style of pop-up sorter uses multiple narrow conveyor belts instead of one wide belt. At each divert point, angled wheels are positioned in the gaps between narrow belts. These wheels sit below the level of the conveyor until they are needed to divert a carton. When a product reaches the divert point, the angled wheels rise up under the product and divert it. Pop-up style sorters work best for delivery cartons or other items with firm, flat bottoms. The function of the pop-up sorters and narrow belt sorters is accordingly to divert the product by a mechanism located at each output. The product is pushed upward while it is turned out (a previous analysis of the operation is required to determine which of the two sorters accuracy is a better proposal). Pop-up sorters and narrow belt sorters typically handle products with rigid and flat bottom.

When speed is of the essence, high-speed mechanical sorters can divert about 150 to 450 items or cartons per minute, or up to 27,000 cartons per hour. Products can be inducted to the sorter manually or automatically using induction conveyor. Higher speed means a higher level of technology and sophistication. There are four common types of high-speed sorters. Tilt-tray, crossbelt and bomb bay sorters are typically used to sort individual items to workstations such as packing stations or returns processing stations. The fourth type of high-speed sorter is a sliding shoe sorter, which usually handles larger cartons and totes. Tilt tray, crossbelt and bomb bay sorters operate under similar principles, and each type of sorter has the same foundation: a looped track with individual carriages riding on the track.

In a tilt tray sorter, each carriage holds a wooden or plastic tray. Items arrive at the sorter and are released one at a time onto the trays. An item moves around the track until it reaches its intended divert location. Its tray then tilts to one side and gravity pulls the item off the tray. Items usually slide onto a chute or onto a takeaway conveyor positioned at the side of the sorter. The tray then rights itself and is ready to accept another item for delivery. A tilt tray sorter requires more space between divert locations than a crossbelt sorter, but it also has fewer moving parts, making it less expensive and easier to maintain. A tilt tray sorter operates by trays that when they reach the correct position, they lean forward and drop the product. Like the crossbelt it is for demanding operations, but must be analyzed under the operation, type of product or industry. A tilt tray sorter can typically handle different packages, which can be small or large, amorphous, or regular, light or as heavy. This sorter is particularly suitable for rough operations. Tilt tray sorters and crossbelt sorters are multi-induction have different entry points where different range of products are input.

A crossbelt sorter works on the same basic principle, except instead of a tray, each carriage in the systems holds a 2-foot to 3-foot cell of belt conveyor powered by a small motor. When an item reaches the divert location, the motor moves the conveyor, discharging the item sideways off the sorter into a chute or onto a takeaway conveyor. While crossbelt sorters are the most expensive of these high-speed options, they also offer the most product control because they use their own power to divert products rather than relying on gravity. This means the sorter can go faster and the divert locations can be placed closer together. Crossbelt sorters are widely used for the shipping industry and in general when a large number of outputs are required for its high productivity in the assortment of products. A crossbelt sorter can handle products with irregular shapes.

In a bomb bay sorter, each carriage on the track holds a flat tray that has a split down the middle. When an item reaches its intended location, the two sides of the tray swing down and apart, dropping the item into a chute or container positioned directly below the sorter. Bomb bay sorters are generally less expensive than tilt tray or crossbelt sorters, but they also have the lowest throughout. And while tilt tray and crossbelt sorters can accommodate long items by allowing one item to span across two trays or two belts, bomb bay sorters are limited to small items. And the items have to be able to tolerate the drop without being damaged. Additionally, bomb bay sorters have unique benefits when there are space constraints in a facility. These sortation systems can fit into very narrow spaces because sort locations are positioned directly under the sorter track. Designed for automatic delivery of a mix of light-weight items that can be dropped into chutes, shipping parcels, totes, or sacks, Bomb bay sorters can accommodate items being manually or automatically inducted onto the sorter. Items can be carried in single trays or across two trays, depending upon their size. A bomb bay sorter is generally less expensive than the crossbelt sorter or the tilt tray sorter. A bomb bay sorter uses split (or quartered), hinged trays to carry items to their sortation destinations. When an item arrives at its intended destination, the two halves of the tray drop open, swinging down and apart (like the bomb bay doors of a military aircraft) and allow the item to drop through and into a container below. Driven by separate drive and sprocket assemblies and powered by a single or dual motor with variable frequency drive, the bomb bay sorter (sometimes referred to as "flat sorter") is quiet and energy efficient. With its simple design and few moving parts, bomb bay sorter, or split tray sorter, is also easy to maintain and provides long term performance.

Sliding shoe sorter is another type of sortation device. Items like poly bags that have inconsistent surfaces are better handled with sliding shoe sorters. Similarly, delivery cartons at high speeds usually requires a sliding shoe sorter. Sliding shoe sorters are more expensive, but they are a better choice for fragile items and can be run at slower speeds if high throughput is not necessary. Instead of being configured in a loop, a sliding shoe sorter is linear: products enter at the beginning of the line and are diverted before they reach the end of the line. The bed of a sliding shoe sorter is essentially a length of metal slat conveyor with a small rubber clock (called a shoe) mounted on each slat. In most designs, the shoes line up along the side of the conveyor opposite the divert locations. The conveyor carries a carton along the line, and when the carton reaches the carton's divert location, several shoes are activated. The shoes slide across the slats and push the carton off the side off the sorter, usually at a slight angle. The idea is as the shoe slides across the conveyor, it is guiding the carton and changing its orientation at the same time. An alternate design places shoes down the center of the conveyor and pushes cartons in either direction.

There are further kinds of mechanical sorters. For example, a vertical sorter helps divert products to outlets in different plane (top, middle or low). Usually, a vertical sorter has up to three outputs and can handle flows of heavy cases. A vertical sorter can handle rates of 0 to 60 cases per minute. Another type of sortation device is a split tray sorter whose name stems from the split configuration of the sortation conveyor's doors, which can be opened independently, with each cell being comprised of up to four compartments. A further type of sorter is a flat sorter (sometimes referred to as "bomb bay sorter") whose name is derived from one of the most popular applications for the sortation conveyor, which is the delivery of "flats" such as garments and envelopes. A further type of sorter is a drop tray sorter whose name springs from the action of the carrying tray, which drops open, allowing items to fall into awaiting chutes or containers. A sorter diverter is another kind of device related to sortation that moves the product onto a conveyor. The diverter, which can be an electro-pneumatic or electric device, is activated when detected, pushing it toward the indicated output A sorter diverter typically has a rate of 1 to 40 cases per minute. A sorter diverter can handle products not so regular shapes, not necessarily of flat and rigid bottom. It can handle products from very small and light as CDs, glasses, medicine (here the flow can be handled up to 100 items per minute) to heavy packages and regular sizes.

A key component of most mechanical sorters is a fixed-position bar code scanner. The scanner identifies each carton or item on the conveyor and sends that information to the sortation system controls. Sortation and/or delivery control systems are typically pre-programmed with the destination of each product and can activate the sortation mechanism when the product arrives at its designated divert point. The smaller the item, the more scanners or sensors is needed to ensure the item is seen. If the product being sorted is particularly valuable, or if there is a question about product movement, sensors can even be put in the chutes themselves to confirm that the item was accurately diverted.

Control server 126 as described herein as well as the controller as described herein can be used in conjunction with all kinds of compatible sortation devices, techniques, and systems, including those as described above and commonly referred to herein as "mechanical sorters". Accordingly, it is reiterated that the descriptions of the various embodiments of the present invention have been presented for purposes of illustration but are not intended to be exhaustive or limited to the embodiments disclosed.

In at least one embodiment, control server 126 is configured to control an article delivery system that may include an article delivery device and an article receiving container. The article delivery device is provided thereon with a plurality of article checking inlets and a plurality of article collecting devices, the plurality of article outlets are respectively located at the middle or/and edges of the article delivery device, and the article receiving container is provided thereon with storage devices, with one storage device located at each of positions under the article outlets, and an opening diameter of the storage device is greater than a diameter of the article outlet. The system controlled by control server 126 can utilize a "double" structure, with the article delivery device and the article receiving container being arranged up and down for delivery articles, wherein the article outlets on the article delivery device are in communication with the article receiving container, and during article delivery, the articles to be delivered and sorted can enter the article receiving container arranged below just by passing through the article outlets, thereby completing the delivery. Such a structural design enables that the article outlets can be flexibly arranged at the edges of the article delivery device or at middle positions of the edges, rather than only being provided at the edges of the article delivery device as those in the prior art, which effectively improves the utilization ratio of the article delivery device, avoids article accumulation, shortens the transport path for article delivery, and increases the article delivery efficiency, realizing an ingenious design.

Embodiments described herein provide for a micro-fulfillment solution in a store backroom set up. The solution can be quickly deployed, and the solution can greatly lower labor and cost, increase speed and accuracy at a fraction of the cost of a typical automated storage and retrieval system (ASRS) solution. Embodiments described herein can facilitate inbound sortation of mixed containers of articles and small cases containing articles to aisle segments for more efficient shelf stocking. Embodiments described herein can enhances BOPIS (Buy Online Pick-up in Store) order processing by allowing store batch picking by department or by aisle. BOPIS order processing can provide for automated, accurate and efficient order consolidation. Embodiments described herein can facilitate home delivery orders in the same manner to allow fast processing and minimize labor and store aisle congestion. Embodiments described herein can provide for picking and delivery of BOPIS & e-commerce orders in the same batch, on-demand.

Embodiments described herein can provide for automation of order consolidation with an accuracy of virtually 100%, increasing customer service and satisfaction. Embodiments described herein can result in labor cost being dramatically reduced since multiple-order batch picking with consolidation done by delivery system 300 can cost less than ½ the labor of traditional store order fulfillment. Embodiments described herein can deliver and sort outbound home delivery packages by route or local hub destination for DDU (Destination Delivery Unit), local carriers and other delivery methods allowing same day/next-day delivery at a pre-sort final mile introduction cost. Embodiments described herein can allow for large bulky products to be handled on a lower-level platform of the delivery system, with smaller products handled on a higher-level platform of the delivery system.

In one implementation, delivery system 300 includes an article delivery mechanism and an article receiving container 20. The article delivery mechanism or device is provided thereon with a plurality of article checking inlets and a plurality of article outlets, and the article receiving container is located just below the article delivery device. The plurality of article outlets on the article delivery device are respectively in communication or connected with the article receiving container, the plurality of article outlets are respectively located at the middle or/and edges of the or throughout the article delivery device, and the article receiving container is provided thereon with storage devices, with one storage device located at each of positions of the article outlets, and an opening dimension of the storage device is greater than the width of the article outlet. It is to be noted that while various aspects of the presently disclosed subject matter are being described herein with respect to delivery of an article, embodiments of the presently disclosed subject matter nonetheless equally apply to an article containing two or more articles. The disclosed provided herein accordingly equally applies to delivery of articles as well as to articles containing two or more articles. The article delivery device and the article receiving container may be embodied in many structures, e.g., quadrangle, circle, polygon and so on, and the article receiving container and the article delivery device preferably have substantially the same area.

After obtaining the article information, in order to improve the efficiency of the subsequent delivery processes, system 100, in one embodiment, further includes a plurality of mobile transport devices 302, wherein the plurality of mobile transport devices 302 are in connection with control server 126, control server 126 is pre-provided with article outlets respectively corresponding to different destinations. Control server 126 is configured to control, according to the obtained destinations of the articles to be delivered and sorted, at least one of the mobile transport devices 302 to transport the articles to be delivered and sorted to the article outlets corresponding to the destinations of the articles to be delivered and sorted. In the above, control server 126 has already obtained the destinations of the respective articles to be delivered and sorted at the respective article checking inlets, and the article delivery can be completed just by obtaining the transport paths of the respective articles to be delivered and sorted through analysis according to the positions of the article outlets corresponding to the destinations of the respective articles to be delivered, and then controlling at least one of the mobile transport devices 302 to transport, according to the transport paths, each of the articles to be sorted to the article outlets corresponding to the destinations of the articles to be delivered. The analysis by control server 126 on the transport paths of the respective articles to be delivered is performed simultaneously. After the path analysis is completed, the plurality of mobile transport devices 302 may be simultaneously controlled, to simultaneously complete transporting of the individual articles to be delivered, thereby significantly improving the article delivery efficiency.

Each of the mobile transport devices 302 is configured to load one article to be sorted or a plurality of articles to be sorted that go to the same destination. Preferably, the mobile transport device 302 is configured to transport one article to be sorted one time, and control server 126 sends a control instruction to the mobile transport device 302 after obtaining the destination of the article to be delivered and sorted that is going to be transported by the mobile transport device 302, such that the mobile transport device 302 travels to the position of the article outlet corresponding to the destination of the article to be delivered and sorted.

In the above, the articles to be delivered and sorted may be manually loaded onto the mobile transport devices 302, and the articles to be delivered and sorted may also be automatically loaded onto the mobile transport devices 302 by intelligently controlling article gripping devices or the like through the control server 126. Similarly, the transport of the articles to be delivered and sorted from the article outlets to the article receiving container can be performed manually and may also be completed by intelligently controlling article gripping devices or the like through the control server 126.

In order to assure that the respective articles to be delivered and sorted that are transported into the article receiving container can be delivered to its ultimate destination, the system preferably further includes a detection device and a transfer device, wherein the detection device is configured to detect whether a storage device is full or not and to transmit to control server 126 the obtained information regarding whether the storage device is full or not, and the transfer device is configured to transfer the storage device which is full according to an instruction from the control server 126. There are many options for the transfer device, e.g., an intelligent robot; and for another example, the storage device is mounted on the transfer device, and the transfer device is a large-scale auto-navigating vehicle and may move to a position and load and unload the articles according to the control instruction of the control server 126.

In at least one embodiment, when control server 126 determines that an order has been completed, control server 126 updates an electronic database to reflect this, with control server 126 being in electronic communication with the electronic database. In one embodiment, the electronic database may reside in the cloud. According to at least one embodiment, each time the computer-controlled device deposits an item into a destination container, control server 126 may update the status of the order in the electronic database.

An operator may select one or more articles from the container such as carrier 132 and image an identifier positioned on each of one or more articles via the information acquisition device 120. Optionally, the information acquisition device 120 may automatically interact with identifier for article recognition. The operator may place the one or more articles on the mobile transport device 302, or the system and process may be set up so that such deposition of the one or more articles onto mobile transport device 302 is automated. The information acquisition device 120 may then communicate the article identifier information associated with each of the one or more articles to the control server 126.

The article supply, namely the articles shown in the containers, may be a supply of articles that has identifier on each article. The information acquisition devices 120 obtain the information contained in the identifier of the articles to be delivered and sorted by identifying the information codes on the articles to be delivered and sorted, wherein the information code may be a bar code, a two-dimensional code, a radio frequency tag etc., and correspondingly, the information acquisition device 120 may be a bar code scanner, a two-dimensional code scanner, a radio frequency identifier, etc. Additionally, the information acquisition device may be configured to image the one or more articles and compare against a database of known articles to determine a characteristic, SKU, or identity of each of the one or more articles.

The mobile transport device 302 may have a first position in which one or more articles are stowed about the device and a second position in which the one or more articles are deposited into a proximal destination container. In one or more embodiments, the mobile transport device 302 may be an auto-navigating small device. Control server 126 may be further configured to direct a plurality of mobile transport devices such that the mobile transport devices do not collide with one another. Control server 126 may also be configured to direct the mobile transport device to return to be proximally located at any article supply. The mobile transport device is in the first position upon being proximal at an article supply.

The control server 126 can be configured to determine one receiving container 20 among a plurality of destination containers to deposit, with the mobile transport device 302, a selected article based on the interaction with the identifier. Control server 126 is further configured to direct the mobile transport device to transport the selected article to the destination container and deposit the article by manipulation of the mobile transport device from the first position to the second position for deposit of the selected article in the destination container.

Delivery system 300 may be embodied in a multiple level arrangement. The multiple level arrangement may include an elevated platform above a lower level, which may be the floor or a second platform. In operation, control server 126 determines that a destination container needs an article deposited therein. In the multiple level arrangement, the destination container is positioned proximal an opening in the elevated platform. The mobile transport device traverses the elevated platform to the destination container and deposits the article by manipulation of the mobile transport device from the first position to the second position for deposit of the selected article in the destination container.

Accordingly, in at least one embodiment, during the delivery process, control server 126 is configured to receive an order for a plurality of disparate articles 142 to fulfill one or more orders. The disparate articles 142 may be a plurality of similar articles having different sizes, colors, and the like, and/or the disparate articles may be largely unrelated. Control server 126 may be configured to determine one receiving container 20 among a plurality of receiving containers 20 to deposit, with mobile transport device 302, one or more selected articles 142. Control server 126 may be configured to direct the mobile transport device 302 to transport the selected article(s) stowed about the mobile transport device 302 to the receiving container 20 and deposit/unload the article by manipulation of the mobile transport device 302 for deposit of the selected article in the receiving container 20. Control server 126 may further be configured to determine when one or more retail orders have been completed.

In one embodiment, the control system is configured to direct a self-guided hanging vehicle to transport a carrier containing the plurality of disparate articles to a delivery location, the hanging vehicle having a first position in which a carrier containing the plurality of disparate articles is engaged with the hanging vehicle and a second position in which the carrier is detached from the hanging vehicle, the self-guided hanging vehicle configured for traveling in both directions along a plurality of rail sections forming part of an overhead rail network. The control system is further configured to direct the self-guided vehicle to deliver the carrier at the delivery location by manipulation of the hanging vehicle from the first position to the second position.

According to one or more embodiments, a control system operating on control server 126 is configured for use with delivery of a plurality of disparate articles includes a memory and a processor. The control system configured to receive orders for a plurality of disparate articles found within an article supply location. The control system is further configured to direct delivery of selected articles by one or more of: a manual process, a mechanical process, and a robotic process. Additionally, the selected articles can be transferred to the first destination container by any robotic, mechanical, and manual sortation means and combinations thereof. Accordingly, the control system may be configured to direct the transfer of the first and second articles to the first destination container using shoe sorters, conveyors, push arm diverters, Intralox sortation systems and similar other mechanisms. The control system is additionally configured to determine when the first order has been completed.

The control system is further configured to assign a first destination container of a plurality of destination containers to a first order to direct a first computer-controlled mobile transport device to deposit a first article and a second article associated with the first order into the first destination container based on a product type of each article, the first article and the second article selected from the plurality of disparate articles. The control system is also configured to direct the first computer-controlled mobile transport device to transport the first article and the second article from the delivery location and deposit both the first article and the second article in the first destination container by manipulation of the first computer-controlled mobile transport device from a first position to a second position. The control system is additionally configured to determine that the first order has been completed.

In various embodiments, the controller is configured to direct delivery of the at least one selected article to a receiving container by one or more of: a manual process, a mechanical process, and a robotic process. Accordingly, in at least one embodiment, instead of a mobile transport device transporting the first and second articles, the first and second articles can be transferred to the first destination container by any well-known robotic, mechanical and manual sortation and transfer means and combinations thereof; accordingly, the control system may be configured to direct the transfer of the first and second articles to the first destination container using means such as shoe sorters, conveyors, push arm diverters, Intralox sortation systems and similar other mechanisms. For example, the first and second articles may be pushed off in a crossbelt set-up. The control system is additionally configured to determine that the first order has been completed.

In at least one embodiment, the mechanical process includes a conveyance device commonly known or used in the marketplace. Several conveyance devices in the market operate to divert an article from the tilt-tray, cross belt, bomb bay, slide tray, slat shoe, narrow belt, AGV, or similar other conveyance devices while the article is in motion whereby a moving divert is required because the conveyance device can include a fixed track and all articles to be diverted move along the same track at the same speed. The conveyance device controlled by the controller can be operated to divert or drop articles being delivered and sorted into a receiving container. In one embodiment, the receiving container can be a tote, a chute, or a similar other receiving device.

In various embodiments, the controller can advantageously utilize a mechanical process that includes a conveyance device cross-belt sorters or other diverting mechanisms. For example, a cross-belt can be configured to have an adjustable speed and acceleration so that special handling requirements for one or more articles or article classes/categories can be met. In some embodiments, the control system is configured to control other divert methods or movements based on the characteristic identified for a given article. The control system can further be configured to control the diverting device, wherein the diverting device can be configured to have an adjustable speed, acceleration, or similar other aspects such that the special handling requirements for a unique article can be met based on the characteristic identified for a given article. In some embodiments, the presently disclosed controller can advantageously deliver and sort an article by diverting of the article by a diverting arm, a pushing device, or any other similar device to the end destination such as a receiving container or receiving receptacle.

Disclosed herein is a system that includes an article supply. The article supply includes a plurality of articles at an order fulfillment center of a retail store. In operation, the system has a method or material handling system to move and transport containers of articles. The method or material handling system delivers a container of articles to an article supply location. The container may contain product that is identical or may be disparate product. Control server 126 may be configured to direct mobile transport device 302 to transport the selected one or more articles which are stowed about the device to the destination container and deposit the one or more articles by manipulation of the mobile transport device from the first position to the second position for deposit of the selected one or more articles in the destination container.

Delivery system 300 may further include an elevated platform above a lower level. The mobile transport device traverses the platform. The destination container is positioned proximal a recess in the platform. The mobile transport device traverses the platform, positions the device proximal the recess and then manipulates from the first position to the second position to deposit the article. Each mobile transport device may carry a respective single selected article, and multiple mobile transport devices may be traversing the platform at any given time. Control server 126 may be configured to direct the mobile transport device to return to a position proximal an article supply. The mobile transport device is in the first position upon being proximal an article supply. Control server 126 may be configured to direct a plurality of mobile transport devices. Control server 126 is further configured to direct the plurality of mobile transport device is such that the mobile transport devices do not collide with one another.

FIG. 7 illustrates a delivery system 500 that can form part of a store backroom delivery environment such as store backroom delivery environment 200 or store backroom delivery environment 400. In various embodiments, delivery system 500 includes a platform with a highway and fingers layout according to at least one embodiment of the present invention. As illustrated in FIG. 7, in some embodiments, panel 10 of the platform assembly can be in the form of fingers 501 and a highway 503. In this embodiment, delivery locations 104 are arranged along highway 503 whereas storage devices 103 are arranged along fingers 501, both in the manner illustrated in FIG. 7. In some embodiments, the delivery locations 104 and the storage devices 103 can be arranged in alternate locations or in other locations, as needed.

According to one or more embodiments, a system 100 is provided. System 100 comprises: an article supply location 122 including a plurality of articles 142, each article 412 having an identifier that includes information related to a destination for delivering the article thereto. System 100 further includes an overhead rail network 112 comprising a plurality of rail sections. At least one rail section is positioned close to the article supply location 122. System 100 also includes self-guided hanging vehicles 102 configured for traveling in both directions along the plurality of rail sections. Each hanging vehicle 102 has a first position in which a carrier 132 containing at least one selected article 142 is engaged with hanging vehicle 102 and a second position in which the carrier is detached from hanging vehicle 102. System 100 further includes an information acquisition device 120 configured to interact with the identifier associated with the at least one selected article 142.

System 100 further includes a controller such as control server 126. The controller or control server 126 is configured to: determine a first delivery location 104 among a plurality of delivery locations 104 to deliver, with the hanging vehicle, the carrier based on the interaction with the identifier and a determined destination for the at least one selected article 142. The controller is further configured to direct the hanging vehicle 102 to transport the carrier 132 to the first delivery location 104 and deliver the carrier by manipulation of the hanging vehicle 102 from the first position to the second position to detach the carrier for delivery of the carrier at the first delivery location 104. The controller is further configured to determine one receiving container 20 of a plurality of receiving containers 20 to deposit the at least one selected article based on the interaction of the information acquisition device 120 with the identifier; and direct delivery of the at least one selected article at the first delivery location to the receiving container.

According to one or more embodiments, a controller of control server 126 is configured to direct delivery of the at least one selected article 142 using a mobile transport device 302, wherein the controller is further configured to direct the mobile transport device 302 to transport the selected article 142 to the receiving container 20 and deposit the article by manipulation of the mobile transport device 302 from a third position to a fourth position for receipt of the selected article in the receiving container 20.

According to one or more embodiments, the controller is configured to direct delivery of the at least one selected article by a mechanical sorter, wherein the controller is further configured to direct the mechanical sorter to deposit the selected article in the receiving container. According to one or more embodiments, the controller is configured to direct delivery of the at least one selected article by a manual process, wherein the controller is further configured to generate a notification at or near the delivery location 104 for a human for depositing the selected article in the receiving container.

According to one or more embodiments, the hanging vehicle 102 is configured to one or more of: diverting, merging, and stopping at any location along the plurality of rail sections. The hanging vehicle 102 optionally further comprises a picking mechanism attached thereto, wherein the picking mechanism is configured to engage and disengage the carrier. The picking mechanism can include any picking devices and systems well known in the art. According to at least one embodiment, the picking mechanism is configured for manual disengagement of the carrier by an operator on a floor level. According to one or more embodiments, the operator is one or more of a human and a robot.

According to one or more embodiments, the at least one article comprises a plurality of articles associated with a multiple-order batch. According to one or more embodiments, the first delivery location 104 corresponds to an aisle segment in a retail store. According to one or more embodiments, the article supply location is positioned near one or more of: a loading dock of a retail store, and a storage location at a back room of a retail store. According to one or more embodiments, the carrier 132 comprises one or more of a container and a tote. According to one or more embodiments, the first delivery location comprises an elevator configured for transporting the carrier 132 to an above floor level or a below floor level. According to one or more embodiments, the controller is further configured to deliver the at least one selected article 142 to a front region of a retail store for pick-up by a customer. According to one or more embodiments, a whole of the overhead rail network, or a portion thereof, is located at a backroom of a retail store. According to one or more embodiments, the at least one selected article 142 comprises a plurality of selected articles 142, wherein the article supply location is a retail store. According to one or more embodiments, the receiving container 20 comprises one or more of a chute, a gaylord, a receptacle, a gravity conveyor, a bin, and a bag.

According to at least one embodiment, a method may also be provided. The method may include receiving an order for a plurality of disparate articles, determining one destination container of a plurality of destination containers to direct the mobile transport device to deposit a selected article, directing the first mobile transport device to transport the selected article to the destination container and deposit the article by manipulation of the first mobile transport device from the first position to the second position for deposit of the selected article in the destination container, directing the second mobile transport device to transport a disparate article to the destination container and deposit the disparate article by manipulation of the second mobile transport device from the first position to the second position for deposit of the selected disparate article in the destination container, and determining when the order has been completed. The method can further include directing removal of the first destination container. In some embodiments, the method further includes directing an order-removing equipment to perform removal of the first destination container. In one embodiment, the method further includes replacement with a second container to receive the continuation of a large order or a new order.

In some embodiments, control server 126 is further configured to direct removal of all articles in the first destination container for online order fulfillment processing and assign a third order to the first destination container. In some embodiments, an order-removing equipment performs removal of the first destination container. In various embodiments, the order-removing equipment can represent any suitable mechanism already known in the art including mechanisms such as a rail-based equipment, an autonomous mobile robot (AMR), an automated guided vehicle (AGV), and a self-propelled first destination container.

The article storage area within the article delivery center from which the articles to be delivered and sorted are pulled can represent any location wherein disparate articles associated with a plurality of orders are received and delivered and sorted for online order fulfillment. Accordingly, the article delivery center can represent a distribution center, a retail store, a micro fulfillment center, store backroom facility, a shipping facility, or a similar other facility. The articles can also be pulled directly from trucks. In one embodiment, the articles can be pulled from article storage locations of an article delivery center.

In some embodiments, control server 126 is further configured to direct an automated deposition of the first and second articles onto the first computer-controlled mobile transport device. In other words, the induction of the first and second articles onto the first computer-controlled mobile transport device is performed automatically as controlled by the control system. In some alternate embodiment, the induction of the first and second articles onto the first computer-controlled mobile transport device is performed manually whereby a human operator loads the first and second articles onto the first computer-controlled mobile transport device.

In some embodiments, control server 126 is further configured to direct transport of the first destination container to an online order fulfillment processing location after all articles associated with the first order have been deposited into the first destination container. The online order fulfillment processing location can include shipping, packing and any other downstream operation. In some embodiments, control server 126 is further configured to assign a new order to a replacement destination container that is placed in the location from where the first destination container was removed after all articles associated with the first order have been deposited into the first destination container. In some embodiments, after all articles associated with the first order have been deposited into the first destination container, control server 126 is further configured to direct further tasks including subsequent packaging, labelling, gift wrapping, quality control checking, and shipping of the first order to its ultimate customer destination.

In some embodiments, the platform of platform assembly 10 can include multiple levels with each level including a plurality of destination containers. In some embodiments, the weight and volume of each article is captured by the control system. In some embodiments, the induction of the articles is done automatically. In some embodiments, each time the computer-controlled device deposits an article into a destination container, control server 126 may update the status of the order associated with either the article or the destination container. In some embodiments, when all articles for a given order have been deposited in the destination container, control server 126 will indicate that the order is ready be removed from the destination location. After the order is removed and the destination is prepared to receive more articles, control server 126 assigns a new order to the destination.

In some embodiments, order locations may be optimized by control server 126 by positioning a relatively large order nearest to the article supply location to minimize travel distance by the device. In some embodiments, order completion may be optimized by control server 126 by sending an article which is needed in multiple orders to an order which is waiting on that item to be completed. The "further processing" of the completed order may include packaging, labeling, gift wrapping, addition of more articles to the order, quality control, shipping, etc. In some embodiments, the platform can include a highway-and-fingers layout, or a backroom layout as illustrated in FIG. 7, for example. In some embodiments, the platform can include a highway and a single-finger layout or configuration.

In some embodiments, control server 126 directs the completed order to another location in the facility for further processing. The order may be removed either by removing the container or by emptying the container. In some embodiments, order completion is optimized by control server 126 by sending a same article that is to be included in multiple order to be first deposited in a destination container such that the dropping of the article completes the order thereby allowing for the removal of the destination container immediately thereafter for subsequent processing.

Thus, a system includes a first article supply location. The first article supply location includes a plurality of articles to be delivered and sorted that have been pulled from orders from a location in a distribution center. It is to be noted that while the delivery operations according to various embodiments of the presently disclosed subject matter may be described in the context of a distribution center, embodiments of the presently disclosed subject matter apply equally to all other locations that can benefit from the delivery operations disclosed herein including, but not limited to, retail store, dark store, micro fulfillment center, grocery store, or a similar other location; all such locations may alternately be referred to herein as "article delivery center".

In various embodiments, the article supply location is one of a retail store, a fully or partially automated retail order fulfillment store, a dark store and a local fulfilment center. The term "dark store" as mentioned herein may refer to a large warehouse that can either be used to facilitate a "click-and-collect" service, where a customer collects an item they have ordered online, or as an order fulfilment platform for online sales. A dark store may include a retail outlet or distribution center that caters exclusively for online shopping. A dark store may either be used to facilitate a "click-and-collect" service, where a customer collects an item they have ordered online, or as an order fulfilment platform for online sales.

A second article supply location includes a plurality of articles to be delivered and sorted. In one embodiment, the plurality of articles to be delivered and sorted can be pulled from orders from a second article storage location in the article delivery center. In one embodiment, the plurality of articles to be delivered and sorted can come directly from trucks. A product type of each article is determined by interacting with an information acquisition device at the respective first article supply location and second article supply location. First and second computer-controlled mobile transport devices include a first position in which a selected article is stowed about the device and a second position in which the selected article is deposited into a proximal container by manipulating a support of the device that carries the selected article and deposits the selected article when in the second position. A first platform is elevated from a first surface. The first computer-controlled mobile transport device traverses the first platform, and the selected articles are deposited into a destination container positioned about the first surface.

In at least one embodiment, control server 126 is configured to receive an order for a plurality of disparate articles. In one embodiment, the disparate articles are found within the first or second article supply location after the articles have been pulled from a first article storage location of the article delivery center. Control server 126 is configured to determine a first destination container of a plurality of destination containers to direct the first mobile transport device to deposit a selected article from the first or second article supply location based on the determined product type. The destination container corresponds with an order for a first business. Control server 126 is configured to direct the first mobile transport device to transport the selected article to the destination container and deposit the selected article by manipulation of the first mobile transport device from the first position to the second position for deposit of the selected article in the destination container. Control server 126 is configured to determine a second destination container of a plurality of destination containers to direct the second mobile transport device to deposit another article from the first or second article supply location based on the determined product type. The second destination container corresponds with an order for a second customer or a second entity. Control server 126 is configured to direct the second mobile transport device to transport a disparate article to the destination container and deposit the disparate article by manipulation of the second mobile transport device from the first position to the second position for deposit of the disparate article in the destination container. Control server 126 is configured to determine when at least one of the orders has been completed.

According to one or more embodiments, the destination container is positioned proximal an opening in the first platform. The first mobile transport device traverses the first platform proximal the opening, then manipulates from the first position to the second position to deposit the article into the destination container through the opening in the first platform.

According to one or more embodiments, each of the first mobile transport device and second mobile transport device carries a respective single selected article. According to one or more embodiments, the system includes a plurality of additional mobile transport devices. According to one or more embodiments, control server 126 is configured to direct a plurality of additional mobile transport devices. Control server 126 is further configured to direct the plurality of additional mobile transport device is such that the mobile transport devices does not collide with one another.

According to one or more embodiments, a system includes a first article supply location, wherein the first article supply location includes a plurality of articles to be delivered and sorted that have been pulled from orders from a first article storage location in an article delivery center and a second article supply location, wherein the second article supply location includes a plurality of articles to be delivered and sorted that have been pulled from orders from a second article storage location in the article delivery center. A product type of each article is determined by interacting with an information acquisition device with an identifier at the respective first article supply location and second article supply location. A platform assembly includes a platform elevated from a proximal surface. The platform defines an opening and a destination container that is positioned proximal the opening in the platform. The first and second computer-controlled mobile transport devices, each device having a first position in which a selected article is stowed about the mobile transport device and a second position in which the selected article is deposited into a proximal container by manipulating a support of the device that carried the selected article and deposits the selected article when in the second position. The first mobile transport device traverses the platform and positions proximal the opening to deposit the selected article in the destination container by manipulation from the first position to the second position. A control server 126 is configured to receive an order for a plurality of disparate articles. The disparate articles are found within the first and second article supply location after the articles have been delivered and sorted and pulled from one or more article storage locations of an article delivery center or directly from one or more trucks. Control server 126 is configured to determine a first destination container of a plurality of receiving containers to direct the first mobile transport device to deposit the selected article. The first destination container corresponds with an order for a first business. Control server 126 is configured to direct the first mobile transport device to transport a selected article to the first destination container and deposit the article by manipulation of the support of the first mobile transport device from the first position to the second position for deposit of the selected article in the destination container and determine a second destination container of a plurality of destination containers to direct the second mobile transport device to deposit a disparate selected article from the first or second article supply location based on the determined product type. The second destination container corresponds with an order for a second business. Control server 126 is configured to direct the second mobile transport device to transport the disparate selected article to the destination container and deposit the disparate selected article by manipulation of the support of the second mobile transport device from the first position to the second position for deposit of the disparate selected article in the destination container and determine when the order for purchase has been completed.

According to one or more embodiments, control server 126 is further configured to determine a characteristic of one of the articles by interacting with the article with the information acquisition device. The characteristic includes one of size, color, deformation, or another defect of the article.

As to the above, they are merely specific embodiments of the present invention; however, the scope of protection of the present invention is not limited thereto, and within the disclosed technical scope of the present invention, any modifications or substitutions that a person skilled in the art could readily conceive of should fall within the scope of protection of the present invention. Thus, the scope of protection of the present invention shall be determined by the scope of protection of the appended claims.

The invention claimed is:

1. A system comprising:
   an article supply location including a plurality of articles to be sorted;
   an overhead rail network comprising a plurality of rail sections, at least one rail section positioned adjacent to the article supply location;
   a self-guided and self-propelled hanging vehicle configured for traveling in both directions along the plurality of rail sections, the hanging vehicle having a first position in which a carrier containing at least one selected article is engaged with the hanging vehicle and a second position in which at least one of: the carrier is detached from the hanging vehicle, and the selected article is discharged from the hanging vehicle;
   a controller configured to:
      receive an order;
      determine a first delivery location among a plurality of delivery locations to deliver, with the hanging vehicle, at least one of the carrier and the selected article based on a destination determined for the at least one of the carrier and the selected article;
      direct the hanging vehicle to transport the carrier to the first delivery location;
      direct delivery of the at least one of the carrier and the selected article at the first delivery location by manipulation of the hanging vehicle from the first position to the second position;
      direct a mobile transport device to travel on a platform elevated from a proximal surface to transport the at least one of the carrier and the selected article at the first delivery location and sort it to a receiving container proximal the platform, wherein the platform is a continuous planar surface, wherein the receiving container corresponds with the order, the mobile transport device comprising wheels that contact the platform while the mobile transport device travels on the platform; and
      determine when the order is complete.

2. The system of claim 1, wherein the selected article comprises one or more of: a case, a container, an item, a parcel, and a bag.

3. The system of claim 1, further comprising an information acquisition device configured to interact with an identifier associated with the selected article.

4. The system of claim 3, wherein the destination for the at least one of the carrier and the selected article is determined based on an interaction of the information acquisition device with the identifier.

5. The system of claim 1, wherein the carrier and the selected article are delivered at the first delivery location.

6. The system of claim 1, wherein the article is delivered at the first delivery location, and wherein the carrier is not detached from the hanging vehicle.

7. The system of claim 1, wherein the controller is further configured to deposit the at least one of the carrier and the selected article by manipulation of the mobile transport device from a third position to a fourth position for receipt of the at least one of the carrier and the selected article in the receiving container.

8. The system of claim 1, wherein the controller is further configured to direct transferring of the at least one of the carrier and the selected article by a mechanical sorter, wherein the controller is furthermore configured to direct the mechanical sorter to deposit the at least one of the carrier and the selected article in the receiving container.

9. The system of claim 1, wherein the controller is further configured to direct transferring of the at least one selected article by a manual process.

10. The system of claim 9, wherein the controller is further configured to generate a notification for a human, the notification associated with an identification of the receiving container onto which the at least one of the carrier and the selected article is to be deposited.

11. The system of claim 1, wherein the receiving container comprises one or more of: a chute, a gaylord, a receptacle, a gravity conveyor, a bin, and a bag.

12. The system of claim 1, wherein the hanging vehicle is configured to one or more of: diverting, merging, and stopping at any location along the plurality of rail sections.

13. The system of claim 1, wherein the hanging vehicle further comprises a picking mechanism attached thereto, wherein the picking mechanism is configured to engage and disengage the carrier.

14. The system of claim 13, wherein the picking mechanism is configured for manual disengagement of the carrier by an operator on a floor level.

15. The system of claim 14 wherein the operator is one or more of a human and a robot.

16. The system of claim 1, wherein the at least one article comprises a plurality of articles associated with a multiple-order batch.

17. The system of claim 1, wherein the first delivery location corresponds to an aisle segment of a retail store.

18. The system of claim 1, wherein the article supply location is positioned near one of: a loading dock of a retail store, an aisle segment of a retail store, and a storage location at a back room of a retail store.

19. The system of claim 1, wherein the carrier comprises one or more of: a container, a case, a bag, and a tote.

20. The system of claim 1, wherein the first delivery location comprises an elevator configured for transporting the at least one of the carrier and the selected article to an above floor level or a below floor level.

21. The system of claim 1, wherein the controller is further configured to deliver the at least one of the carrier and the selected article to a customer accessible region of a retail store for pick-up by a customer.

22. The system of claim 1, wherein the overhead rail network is located at a backroom of a retail store.

23. The system of claim 1, wherein the at least one selected article comprises a plurality of selected articles, wherein the article supply location is one of: a retail store, a fully or partially automated retail order fulfillment store, and a local fulfilment center. A system comprising:
- an article supply location including a plurality of articles to be sorted;
- an overhead rail network comprising a plurality of rail sections, at least one rail section positioned adjacent to the article supply location;
- a self-guided and self-propelled hanging vehicle configured for traveling in both directions along the plurality of rail sections, the hanging vehicle having a first position in which a carrier containing at least one selected article is engaged with the hanging vehicle and a second position in which at least one of: the carrier is detached from the hanging vehicle, and the selected article is discharged from the hanging vehicle;
- a controller configured to:
  receive an order;
  determine a first delivery location among a plurality of delivery locations to deliver, with the hanging vehicle, at least one of the carrier and the selected article based on a destination determined for the at least one of the carrier and the selected article;
  direct the hanging vehicle to transport the carrier to the first delivery location;
  direct delivery of the at least one of the carrier and the selected article at the first delivery location by manipulation of the hanging vehicle from the first position to the second position;
  direct a mobile transport device to traverse-a platform elevated from a proximal surface to transport the at least one of the carrier and the selected article at the first delivery location and sort it to a receiving container proximal the platform, wherein the platform is a continuous planar surface, wherein the receiving container corresponds with the order; and
  determine when the order is complete,
  wherein the article is delivered at the first delivery location, and wherein the carrier is not detached from the hanging vehicle.

* * * * *